United States Patent
Wand et al.

(10) Patent No.: US 7,425,281 B2
(45) Date of Patent: Sep. 16, 2008

(54) LIQUID CRYSTAL COMPOSITIONS COMPRISING AN ORGANOGERMANIUM COMPOUND AND METHODS FOR USING THE SAME

(75) Inventors: Michael D. Wand, Boulder, CO (US); Kundalika M. More, Denver, CO (US); William N. Thurmes, Longmont, CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 11/292,510

(22) Filed: Dec. 2, 2005

(65) Prior Publication Data

US 2006/0157673 A1 Jul. 20, 2006

Related U.S. Application Data

(60) Provisional application No. 60/632,614, filed on Dec. 2, 2004.

(51) Int. Cl.
- *C09K 19/52* (2006.01)
- *C09K 19/34* (2006.01)
- *C09K 19/12* (2006.01)
- *C09K 19/20* (2006.01)
- *C07F 7/30* (2006.01)

(52) U.S. Cl. .............. 252/299.01; 252/299.5; 252/299.61; 252/299.64; 252/299.65; 252/299.66; 252/299.67; 556/87; 556/95; 556/106; 556/107; 556/108

(58) Field of Classification Search ............ 252/299.01, 252/299.5, 299.61, 299.64, 299.65, 299.66, 252/299.67; 428/1.3; 556/87, 108, 95, 106, 556/107; 544/242, 298, 335; 546/1, 250; 560/8; 570/129, 131; 549/369
See application file for complete search history.

(56) References Cited

U.S. PATENT DOCUMENTS

| | | | | |
|---|---|---|---|---|
| 5,788,880 A | * | 8/1998 | Schierlinger et al. ... | 252/299.61 |
| 5,951,912 A | * | 9/1999 | Mercer .................. | 252/299.01 |
| 6,749,771 B1 | * | 6/2004 | Cherkaoui et al. ..... | 252/299.01 |

OTHER PUBLICATIONS

Bares et al, "Preparations and Reactions of Symmetrical Dimethykenebiphenyl Dianions; Conformations of [0.n]-o-Cyclophanes. A simple NMR Method for Determining Twist Angles in Biphenyls", J. Org. Chem, vol. 54, pp. 311-317, 1989.*
Caplus 1989: 57278.*
Caplus 1978: 43655.*
Caplus 1980: 42407.*

* cited by examiner

*Primary Examiner*—Shean C Wu
(74) *Attorney, Agent, or Firm*—Don D. Cha; Hamilton DeSanctis & Cha, LLP

(57) ABSTRACT

The present invention provides organogermanium compounds and liquid crystal compositions comprising such a compound.

28 Claims, 5 Drawing Sheets

LIQUID CRYSTAL COMPOSITIONS COMPRISING AN ORGANOGERMANIUM COMPOUND AND METHODS FOR USING THE SAME

CROSS-REFERENCE TO RELATED APPLICATIONS

This application claims the priority benefit of U.S. Provisional Application No. 60/632,614, filed Dec. 2, 2004, which is incorporated herein by reference in its entirety.

STATEMENT REGARDING FEDERALLY SPONSORED RESEARCH

The U.S. Government has a paid-up license in this invention and the right in limited circumstances to require the patent owner to license others on reasonable terms as provided for by the terms of Grant No. DMI-0340407 awarded by the National Science Foundation.

FIELD OF THE INVENTION

The present invention relates to liquid crystal compositions comprising an organogermanium compound and methods for using the same.

BACKGROUND OF THE INVENTION

The optical properties of liquid crystals can be modified by an applied voltage. Therefore, liquid crystals are commonly used as dielectrics in display devices. Electro-optical devices based on liquid crystals are well known to one skilled in the art.

The liquid crystal materials must have good chemical and thermal stability and good stability to electric fields and electromagnetic radiation. In addition, the liquid crystal materials should have low viscosity and produce short addressing times, low threshold voltages and high contrast in the cells. They should also have a suitable mesophase at the usual operating temperatures, i.e., in the broadest possible range above and below room temperature. Furthermore, since liquid crystals are generally used as mixtures of a plurality of components, it is important that the components are readily miscible with one another. Other properties, such as the electrical conductivity, the dielectric anisotropy and the optical anisotropy, have to satisfy various requirements depending on the cell type and area of application.

With the development of many different types of liquid crystal display devices and elements, there continues to be a great demand for liquid crystal compositions that have many of the properties discussed above. Accordingly, there is a continuing need for liquid crystal compositions that can achieve or meet various properties and/or requirements.

SUMMARY OF THE INVENTION

One aspect of the present invention provides a liquid crystal composition comprising at least two different compounds, where at least one of the compounds is an organogermanium compound.

Another aspect of the present invention provides a liquid crystal composition which is in a liquid crystal phase at room temperature, wherein the liquid crystal composition comprises an organogermanium compound. Such liquid crystal composition can also include a non-organogermanium compound and/or one or more other organogermanium compounds.

Still another aspect of the present invention provides an enantiotropic liquid crystal composition comprising an organogermanium compound.

Yet another aspect of the present invention provides a compound of the formula:

D-E-F;

where
- D is a chain having from about 5 to about 20 chain atoms, wherein each of the chain atoms is independently selected from the group consisting of C, O, N, S, Ge, and Si;
- E is a core moiety having two, three, or four ring moieties, wherein each ring moiety is connected to the other ring moiety by a linker, and wherein each linker is independently comprised of from 0 to about 5 chain atoms;
- F is a chain having from about 5 to about 20 chain atoms, wherein at least one of the chain atoms is germanium and each of the remaining chain atoms is independently selected from the group consisting of C, O, N, S, and Si.

Another aspect of the present invention provides a compound of the formula:

$$R^1\text{-}[X]_a\text{-}Q^1\text{-}[L^1]_e\text{-}[Q^2]_d\text{-}[L^2]_f\text{-}Q^3\text{-}[Y]_b\text{—}R^3\text{—}[Si(R^4)_2]_c\text{—}R^5\text{—}GeR^6R^7R^8$$

where
- each of a, b, c, d, e, and f is independently 0 or 1;
- each of X and Y is independently O, S, C(=W), -Z-C(=W)—, —C(=W)-Z-, —C≡C—, or $NR^2$;
- W is O or S;
- Z is O, S, or $NR^9$;
- $R^1$ is selected from the group consisting of alkyl, haloalkyl, and heteroalkyl;
- each of $R^2$ and $R^9$ is independently hydrogen, alkyl, or a nitrogen protecting group;
- each of $R^3$ and $R^5$ is independently selected from the group consisting of alkylene, haloalkylene, and heteroalkylene;
- each $R^4$ is independently selected from the group consisting of hydrogen or $C_{1-4}$ alkyl;
- each of $R^6$, $R^7$, and $R^8$ is independently $C_{1-4}$ alkyl;
- each of $Q^1$, $Q^2$ and $Q^3$ is independently selected from the group consisting of cycloalkylene, heterocycloalkylene, cycloalkenylene, heterocycloalkenylene, arylene, and heteroarylene each of which is optionally substituted; and
- each of $L^1$ and $L^2$ is a linker having from 0 to about 5 chain atoms.

In one embodiment, $R^1$ is $C_{4-15}$ alkyl or $C_{4-15}$ haloalkyl. Within this embodiment, preferably $R^1$ is hexyl, octyl, 2,3-difluorooctyl, 2-fluoro-2-methyloctyl, or decyl.

In another embodiment, a is 1. Within this embodiment, preferably X is O or S.

Yet in another embodiment, each of $Q^1$, $Q^2$ and $Q^3$ is independently selected from the group consisting of phenylene, naphthylene, dihydronaphthylene, tetrahydronaphthylene, cyclyohexylene, dioxylene, pyridinylene, and pyrimidinylene, each of which is optionally substituted with one or two substituents each of which is independently selected from the group consisting of halide, alkyl, haloalkyl, alkoxide, haloalkoxide, nitro, cyano, amino, monoalkylamino, and dialkylamino. Within this embodiment, preferably each of $Q^1$, $Q^2$ and $Q^3$ is independently selected from the group consisting of phenyl-1,4-ene, 1,2,3,4-tetrahydronaphthyl-2,6-ene, 1,3-dioxyl-2,5-ene, pyridinyl-2,5-ene, and pyrimidinyl-2,5-ene, each of which is optionally substituted. More preferably, each of $Q^1$, $Q^2$ and $Q^3$ is independently selected from the group consisting of phenyl-1,4-ene; pyridinyl-2,5-ene; pyrimidinyl-2,5-ene; fluorophenyl-1,4-ene; fluoropyridinyl-2,5-ene; fluoropyrimidinyl-2,5-ene; 2,3-difluorophenyl-1,4-ene; 1,2,3,4-tetrahydronaphthyl-2,6-ene; and 1,3-dioxyl-2,5-ene.

Still in another embodiment, d is 0.

In some embodiments, e is 0. Within these embodiments, preferably f is 0.

Yet in some other embodiments, each of said linkers $L^1$ and $L^2$ is independently selected from a group consisting of alkylene, alkoxylene, heteroalkylene, haloalkylene, carboxylate, carbamoyl, imidine, thiocarboxylate, and alkynylene.

In other embodiments, b is 1. Within these embodiments, preferably Y is O.

In some embodiments, $R^3$ is alkylene. Within these embodiments, one group of compounds are those where c is 0. Within these embodiments, another group of compounds are those where c is 1. When c is 1, preferably each $R^4$ is independently methyl, isopropyl or butyl.

In yet other embodiments, $R^5$ is alkylene.

Another aspect of the present invention provides a composition comprising a compound of any of the compounds described herein.

Still other aspects of the present invention provide an electronic device comprising any of the compounds described herein.

Yet other aspects of the present invention provides a liquid crystal display device comprising any of the compounds described herein.

Another aspect of the present invention provides a method for reducing a layer contraction between smectic A phase to smectic C phase to about 30% or less in a liquid crystal composition, said method comprising preparing a liquid crystal composition comprising about 20% of an organogermanium compound.

In one embodiment, the director tilt angle in the smectic C phase is about 20 degrees.

In another embodiment, the director tilt angle in the smectic C phase is greater than 30 degrees.

Still in another embodiment, the director tilt angle in the smectic C phase is about 45 degrees.

Still another aspect of the present invention provides a liquid crystal composition comprising an organogermanium compound, wherein the layer contraction of said liquid crystal composition between smectic A phase and smectic C phase is about 30% or less.

The present invention also provides a various compositions, liquid crystal compositions, electronic devices, liquid crystal display elements and/or devices that comprise various compounds and compositions described herein.

Still other aspects of the present invention provides a method for reducing a layer contraction between smectic A phase to smectic C phase in a liquid crystal composition.

DETAILED DESCRIPTION OF THE INVENTION

Figure 1:
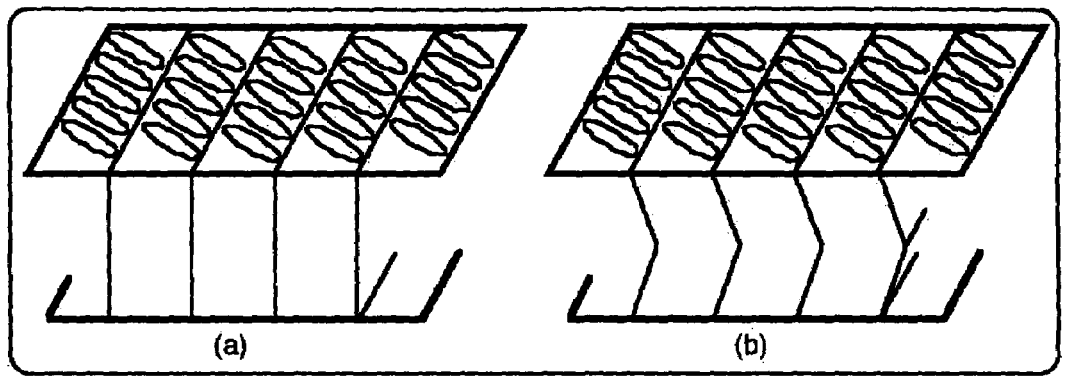
FIGS. 1A and 1B are schematic illustrations of the common geometries for smectic C layers: bookshelf and chevron, respectively, where the ellipses represent FLC molecules.

Liquid crystal materials or compositions are compositions that form one or more liquid crystal phases, including nematic, smectic A, and/or smectic C. Compositions which self-assemble into the smectic C phase are often termed C phase mesogens. While there is currently no detailed understanding of the relationship between molecular structure and the occurrence of LC phases, empirically, C phase mesogens generally possess a rigid core separating two "floppy" tails. Accordingly, one aspect of the present invention provides organogermanium compounds that comprise tail-core-tail structure.

For C* mesogens, generally one of the tails possess one or more chiral centers. In some commonly used C* mesogens, the core comprises a phenylbenzoate moiety, and the chiral tail comprises an ethyl lactate moiety. These C* mesogens, often called lactic ethers, were believed to be the first room temperature ferroelectric liquid crystals (i.e., FLCs) with switching speeds faster than 100 μsec. Unfortunately, some of the earlier lactic ethers were monotropic (i.e., thermodynamically unstable, but kinetically stable) with smectic C* phase between 9° C. and 28° C. The terms "thermodynamically unstable" and "monotropic" are used interchangeably herein and refer to a composition that can enter the liquid crystal state only upon cooling.

To date liquid crystals having many of the desirable properties are not achievable with a single compound. Accordingly, conventional liquid crystals exhibiting many of the desirable properties are made by mixing different compounds. Most commercial LC materials are mixtures composed of several, e.g., at least eight, components (i.e., compounds). FLC materials generally contain two types of components: (1) a smectic C host, which is designed to afford the required temperature range and other standard LC properties; and 2) chiral components designed to induce ferroelectric polarization and produce fast switching or other desirable properties (such as second-order optical nonlinearity) in the FLC film.

One aspect of the present invention provides a liquid crystal composition comprising at least two different compounds, where at least one of the compounds is an organogermanium compound. As used herein, an "organogermanium compound" refers to an organic compound that comprises at least one germanium-oxygen or, preferably, carbon-germanium bond. Typically, the organogermanium compound comprises two or more germanium-carbon bonds, preferably three or more germanium-carbon bonds, and more preferably four germanium-carbon bonds. Alternatively, the number of carbon-germanium bonds in the organogermanium compound can be expressed as: n−x, where n is the oxidation state of germanium and x is the number of carbon-germanium bonds, and where $1 \leq x \leq n$.

While the organogermanium compound in and of itself need not be a liquid crystal compound, in some embodiments, the organogermanium compound is a liquid crystal compound. In some embodiments, compositions of the present invention comprise one or more organogermanium compounds and at least one compound that is a non-organogermanium compound. Suitable non-organogermanium compounds that are useful in forming liquid crystal compositions are well known to one skilled in the art. See, for example, U.S. Pat. Nos. 5,051,506; 5,061,814; 5,130,048; 5,167,855; 5,168,381; 5,178,791; 5,178,793; 5,180,520; 5,271,864; 5,278,680; 5,380,460; 5,422,037; 5,453,218; 5,457,235; 5,539,555; 5,543,078; 5,596,434; 5,585,036; 5,626,792; 5,637,256; 5,658,493; 5,753,139; 5,866,036; 6,569,504; 6,759,101; 6,703,082; 6,413,448; 6,737,124; 6,783,812; Re34,726; and 6,139,771, all of which, including references cited therein, are incorporated herein by reference. Some of these patents, for example, U.S. Pat. Nos. 5,168,381 and 5,596,434, also provide detail of how LC and FLC compositions of the invention can be used for the production of LC cells and optical devices.

Some compositions of the present invention can further comprise two or more organogermanium compound. Regardless of how many different organogermanium compounds are present in the liquid crystal compositions of the present invention, typically the total amount of organogermanium compound(s) is at least 20%. It should be understood that unless specifically indicated the percentages referred to in this disclosure refer to weight percent. While some of the compositions of the present invention are described as having at least 20% organogermanium compound, liquid crystal compositions of the present invention are not limited to specific amounts of organogermanium compound ranges and examples given herein. The amount of organogermanium compound(s) in liquid crystals compositions can vary in order to achieve a particularly desired liquid crystal physical property. As such, liquid crystal compositions of the present invention can have organogermanium compound(s) in the range of 0.01% to 100%. Typically, liquid crystal compositions of the present invention have from about 1% to about 99% organogermanium compound, preferably from about 5% to about 90%, more preferably from about 10% to about 70%, and most preferably from about 20% to about 60%.

The liquid crystal compositions of the present invention are enantiotropic liquid crystal compositions. The terms "enantiotropic" and "thermodynamically stable" are used interchangeably herein and refer to a composition that exhibits the liquid crystal state both upon cooling from its liquid state (or upon cooling from a less-ordered liquid crystal state) and upon heating from its solid state (or upon heating from a more-ordered liquid crystal state).

In some embodiments, liquid crystal compositions of the present invention are ferroelectric liquid crystal compositions.

Typically, the temperature range of smectic C phase of liquid crystal compositions of the present invention is at least about 10° C. wide. Preferably, the smectic C phase temperature range is at least about 30° C. wide, and more preferably at least about 130° C. wide. In other embodiments, the smectic C phase of liquid crystal compositions of the present invention ranges from at least about 15° C. to at least about 45° C., preferably from at least about −10° C. to at least about 60° C., and more preferably from at least about −35° C. to at least about 90° C.

Another aspect of the present invention provides a liquid crystal composition comprising an organogermanium compound, where the liquid crystal composition is in a liquid crystal phase at room temperature. In some embodiments, such liquid crystal composition can further comprise a non-organogermanium compound, such as those described above.

In some embodiments, liquid crystal compositions comprise a second organogermanium compound.

Typically, the total amount of organogermanium compound(s) in the liquid crystal compositions of the present invention is at least about 20%.

The organogermanium compounds of the present invention can be chiral or achiral. When the liquid crystal composition comprises a chiral organogermanium compound, the enantiomeric excess of such chiral organogermanium compound is typically about 70% ee. Preferably, the liquid crystal composition comprising a chiral organogermanium compound has enantiomeric excess of at least about 80% ee, more preferably at least about 95% ee, and most preferably at least about 99% ee. The term "enantiomeric excess" refers to the difference between the amount of enantiomers. The percentage of enantiomeric excess (% ee) can be calculated by subtracting the percentage of one enantiomer from the percentage of the other enantiomer. For example, if the % ee of (R)-enantiomer is 99% and % ee of (S)-enantiomer is 1% within a single mixture, the % ee of (R)-isomer is 99%-1% or 98% ee.

In one particular embodiment, the liquid crystal composition comprises a chiral organogermanium compound.

Another aspect of the present invention provides an enantiotropic liquid crystal composition comprising an organogermanium compound. In one embodiment, such liquid crystal composition is a liquid crystal phase at room temperature.

Still in another embodiment, such liquid crystal composition further comprises at least one non-organogermanium compound.

Still another aspect of the present invention provides an organogermanium compound.

In one particular embodiment, the organogermanium compound is of the formula:

$$D-E-F \qquad \qquad I$$

where
- D is a chain having from about 5 to about 20 chain atoms, wherein each of the chain atoms is independently selected from the group consisting of C, O, N, S, Ge, and Si;
- E is a core moiety having two, three, or four ring moieties, wherein each ring moiety is connected to the other ring moiety by a linker, and wherein each linker is independently comprised of from 0 to about 5 chain atoms;
- F is a chain having from about 5 to about 20 chain atoms, wherein at least one of the chain atoms is germanium and each of the remaining chain atoms is independently selected from the group consisting of C, O, N, S, and Si.

The term "chain" refers to a non-cyclic, straight or branched moiety. It should be appreciated such chain may be substituted with one or more suitable substituents, such as hydroxyl, alkoxy, halide, cyano, nitro, amino, monoalkylamino, dialkylamino, carbonyl oxygen (i.e., =O), and the like. This substitution can also form a small ring moiety within the chain, such that a portion of the chain comprises a cyclic moiety such as an epoxide, a cyclopropyl, a dihydrofuranone, and a dioxolane moiety. Typically, the chain refers to an organic moiety (i.e., comprising carbon and hydrogen atoms), which may also include one or more atoms selected from O, N, S, Si, and Ge.

The term "ring moiety" refers to an aromatic or a non-aromatic monocyclic or bicyclic moiety. Exemplary ring moieties for E include, but are not limited to, cycloalkylene, heterocycloalkylene, cycloalkenylene, heterocycloalkenylene, arylene, and heteroarylene. Each of the ring moieties can be independently optionally substituted with one or more, preferably one, two, or three, substituents within the ring structure. When two or more substituents are present in the ring moiety, each substituent is independently selected. Suitable substituents for a ring moiety include, but are not limited to, halide, alkyl, haloalkyl, alkoxide, haloalkoxide, alkenyl, haloalkenyl, cyano, nitro, amino, monoalkylamino, and dialkylamino.

The term "cycloalkylene" refers to a divalent non-aromatic, saturated monocyclic or bicyclic hydrocarbon moiety of three to fifteen, preferably three to twelve, ring carbons.

The term "heterocycloalkylene" refers to a divalent non-aromatic, saturated monocyclic or bicyclic moiety of three to fifteen, preferably three to twelve, ring atoms in which one or two ring atoms are heteroatoms selected from N, O, or $S(O)_n$ (where n is an integer from 0 to 2), the remaining ring atoms being C, where one or two C atoms can optionally be a carbonyl group.

The term "cycloalkenylene" refers to a divalent non-aromatic, unsaturated monocyclic or bicyclic hydrocarbon moiety of three to fifteen, preferably three to twelve, ring carbons.

The term "heterocycloalkenylene" refers to a divalent non-aromatic, unsaturated monocyclic or bicyclic moiety of three to fifteen, preferably three to twelve, ring atoms in which one or two ring atoms are heteroatoms selected from N, O, or $S(O)_n$ (where n is an integer from 0 to 2), the remaining ring atoms being C, where one or two C atoms can optionally be a carbonyl group.

The term "arylene" refers to a divalent aromatic monocyclic or bicyclic moiety hydrocarbon moiety of three to fifteen, preferably three to twelve, ring carbons.

The term "heteroarylene" refers to a divalent aromatic monocyclic or bicyclic moiety of three to fifteen, preferably three to twelve, ring atoms containing one, two, or three ring heteroatoms selected from N, O, or S, the remaining ring atoms being C.

The terms "halide," "halo," and "halogen" are used interchangeably herein and refer to fluoro, chloro, bromo, or iodo.

The term "alkyl" refers to a saturated linear monovalent hydrocarbon moiety of one to twenty, preferably one to twelve, carbon atoms or a saturated branched monovalent hydrocarbon moiety of three to twenty, preferably three to twelve, carbon atoms. Exemplary alkyl groups include, but are not limited to, butyl, pentyl, hexyl, heptyl, octyl, decyl, and the like.

The term "haloalkyl" refers to refers to an alkyl group as defined herein in which one or more hydrogen atom is replaced by same or different halo atoms. The term "haloalkyl" also includes perhalogenated alkyl groups in which all alkyl hydrogen atoms are replaced by halogen atoms. Exemplary haloalkyl groups include, but are not limited to, fluoromethyl, difluoromethyl, trifluoromethyl, difluoroethyl, trifluoroethyl, pentafluoroethyl, and the like.

The term "alkoxide" or "haloalkoxide" refers to a moiety —OR where R is an alkyl or haloalkyl, respectively, as defined herein.

The term "alkenyl" refers to a linear monovalent hydrocarbon moiety of two to twenty, preferably two to twelve, carbon atoms or a branched monovalent hydrocarbon moiety of three to twenty, preferably three to twelve, carbon atoms, containing at least one carbon-carbon double bond. Exemplary alkenyl groups include, but are not limited to, ethenyl, propenyl, and the like.

The term "haloalkenyl" refers to an alkenyl group as defined herein in which one or more hydrogen atom is replaced by same or different halo atoms. The term "haloalkenyl" also includes perhalogenated alkenyl groups in which all alkenyl hydrogen atoms are replaced by halogen atoms.

The terms "amino," "monoalkylamino," and "dialkylamino" refer to a moiety of the formula —$NH_2$, —NHR, and —$NR^aR^b$, respectively, where each of $R^a$ and $R^b$ is independently alkyl as defined herein, preferably $C_{1-4}$ alkyl.

In one embodiment, each ring moiety of E is independently selected from the group consisting of cycloalkylene, heterocycloalkylene, cycloalkenylene, heterocycloalkenylene, arylene, and heteroarylene, each of which is independently optionally substituted.

In some embodiments, E comprises more than one arylene moiety. Within such embodiments, each arylene is independently selected from phenylene, naphthylene, dihydronaphthylene and tetrahydronaphthylene, each of which is independently optionally substituted.

In some embodiments where the ring moiety comprises heteroarylene, each heteroarylene preferably contains one or two nitrogen ring atoms. Within such embodiments, each heteroarylene is independently selected from optionally substituted pyridinylene and optionally substituted pyrimindinylene.

Ring moieties of some embodiments include, but are not limited to, phenyl-1,4-ene, pyridinyl-2,5-ene, pyrimidinyl-2,5-ene, pyrazinyl-2,5-ene, pyridazinyl-3,6-ene, dithiazolyl-2,5-ene, 1,2,3,4-tetrahydronaphthyl-2,6-ene, 1,2-dihydronaphthyl-2,6-ene, 1,3-dioxyl-2,5-ene, cyclohexyl-1,4-ene, cyclohex-2-enyl-1,4-ene, and cyclohexenyl-1,4-ene, each of which is optionally substituted. Preferred ring moieties include phenyl-1,4-ene, 1,2-dihydronaphthyl-2,6-ene, 1,2,3,4-tetrahydronaphthyl-2,6-ene, 1,3-dioxyl-2,5-ene, pyridinyl-2,5-ene, and pyrimidinyl-2,5-ene, each of which is optionally substituted. Some of the particular ring moieties within these optionally substituted ring moieties include, but are not limited to, phenyl-1,4-ene; pyridinyl-2,5-ene; pyrimidinyl-2,5-ene; fluorophenyl-1,4-ene; fluoropyridinyl-2,5-ene; fluoropyrimidinyl-2,5-ene; 2,3-difluorophenyl-1,4-ene; 1,2,3,4-tetrahydronaphthyl-2,6-ene; and 1,3-dioxyl-2,5-ene.

As stated above, each ring moiety is connected to the other ring moiety by a linker. Each linker is independently comprised of from 0 to about 5 chain atoms.

In some embodiments, each linker is independently comprised of from 0 to about 4 carbon atoms within the linker chain and 0 to 1 heteroatom within the linker chain, where each of the heteroatom is independently selected from O, N and S. The term "linker chain" refers to a chain of atom(s) or a bond that connect two moieties, such as two ring moieties, to one another. The term reflects only those atoms (or bond) that directly connects the two moieties. The linker chain can be substituted with one or more suitable substituents, such as hydroxyl, alkoxy, halide, cyano, nitro, amino, monoalkylamino, dialkylamino, carbonyl oxygen (i.e, =O), and the like. Typically, the linker chain refers to a bond or an organic moiety (i.e., comprising carbon and hydrogen atoms), which may also include one or more atoms selected from O, N, and S.

Some of the specific and general examples of core moiety E of Formula I are shown in Table 1 below, where the dashed line shows the optional presence of a double bond and each Z represents optional substituent on the designated ring as described herein. While not specifically indicated, when Z is present upto the maximum possible number of substituent Z can be present in each ring. That is, the number of Z in each ring can be 0-4 or 0-3 depending on the number of possible sites that are available for substituents. When more than one Z is present, each Z is independently selected. Where Z is present, preferably Z is halogen, more preferably Z is fluoride.

TABLE 1
Examples of core moiety E of Formula I.
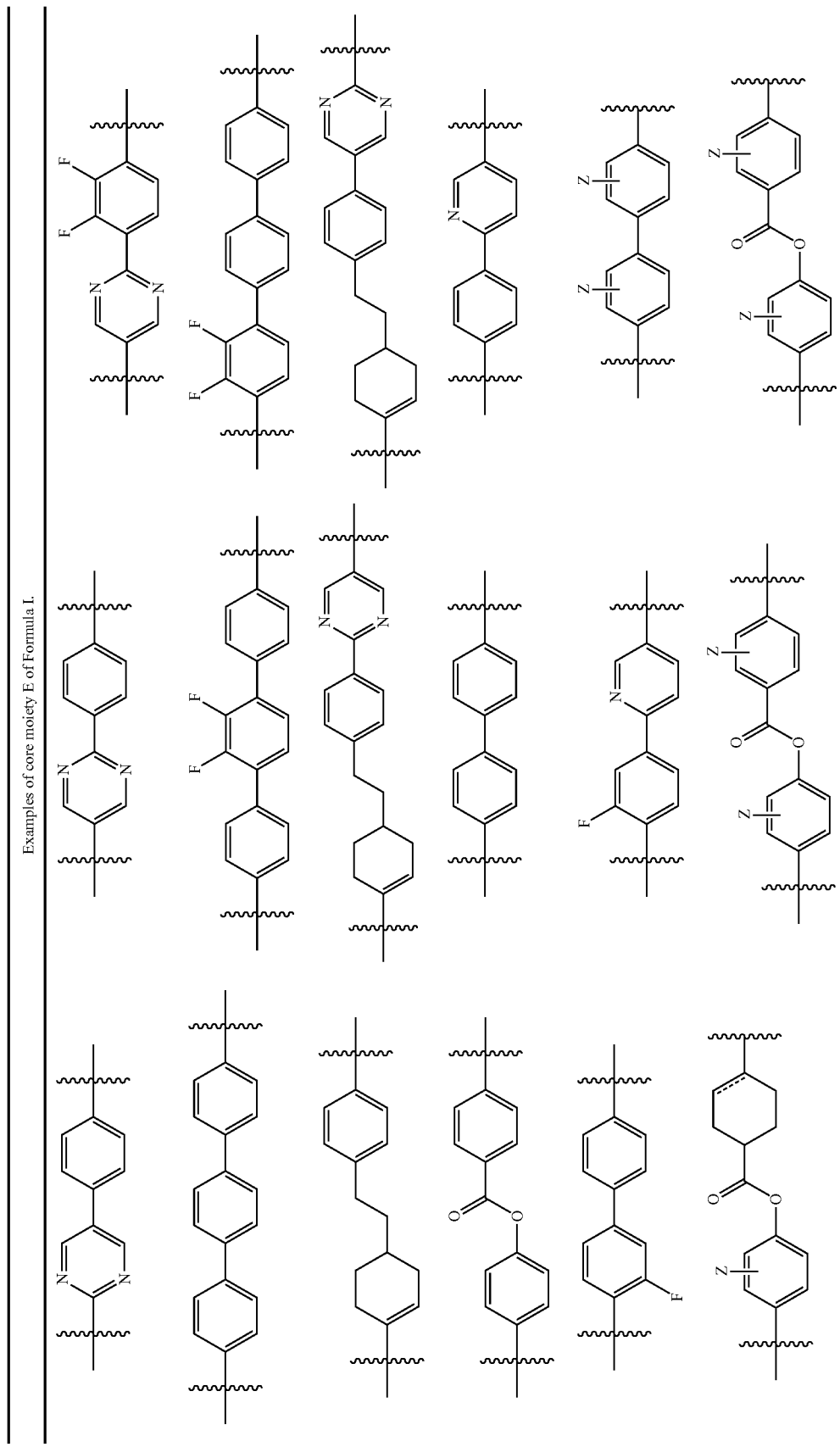

TABLE 1-continued
Examples of core moiety E of Formula I.
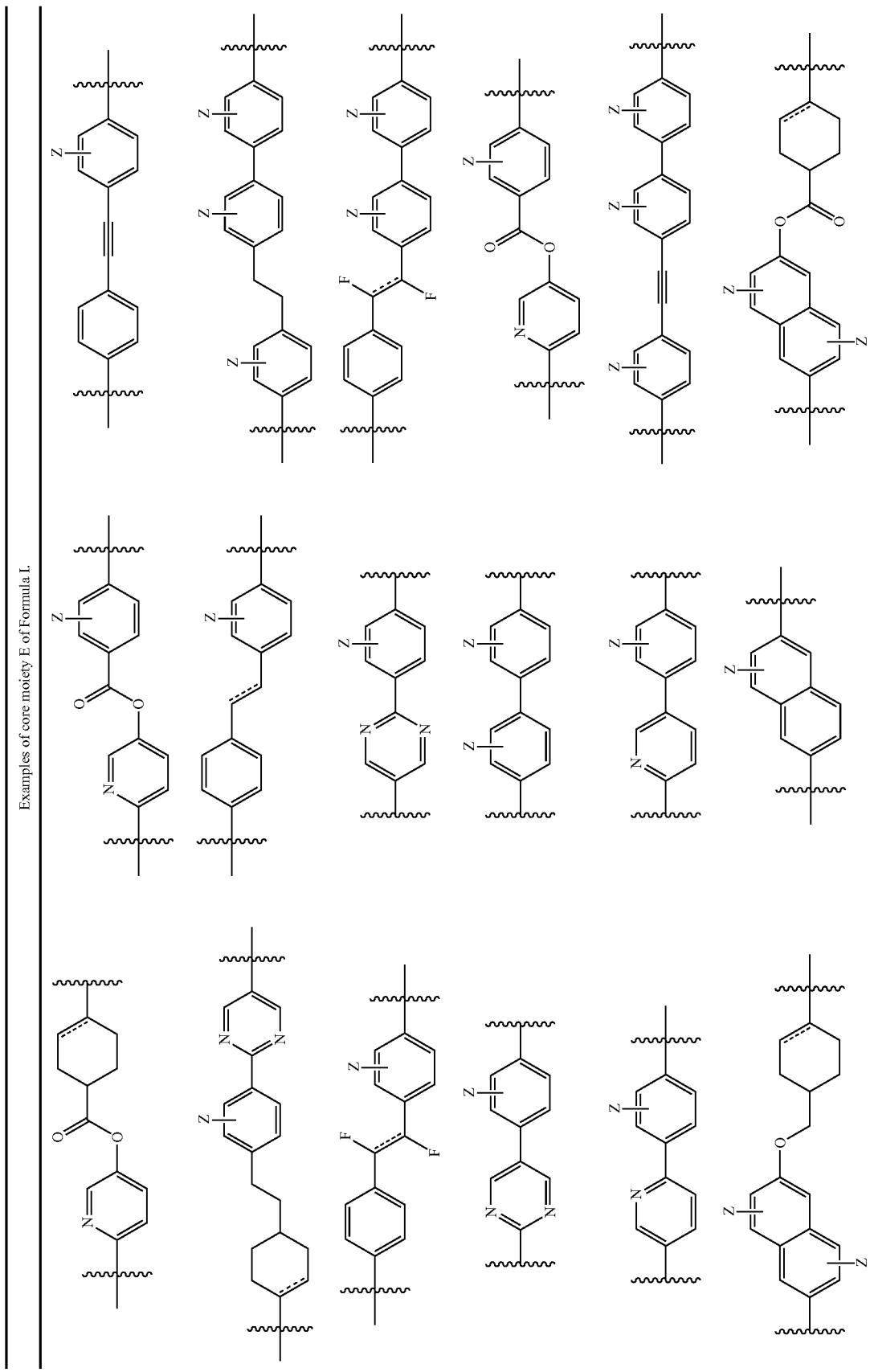

TABLE 1-continued
Examples of core moiety E of Formula I.
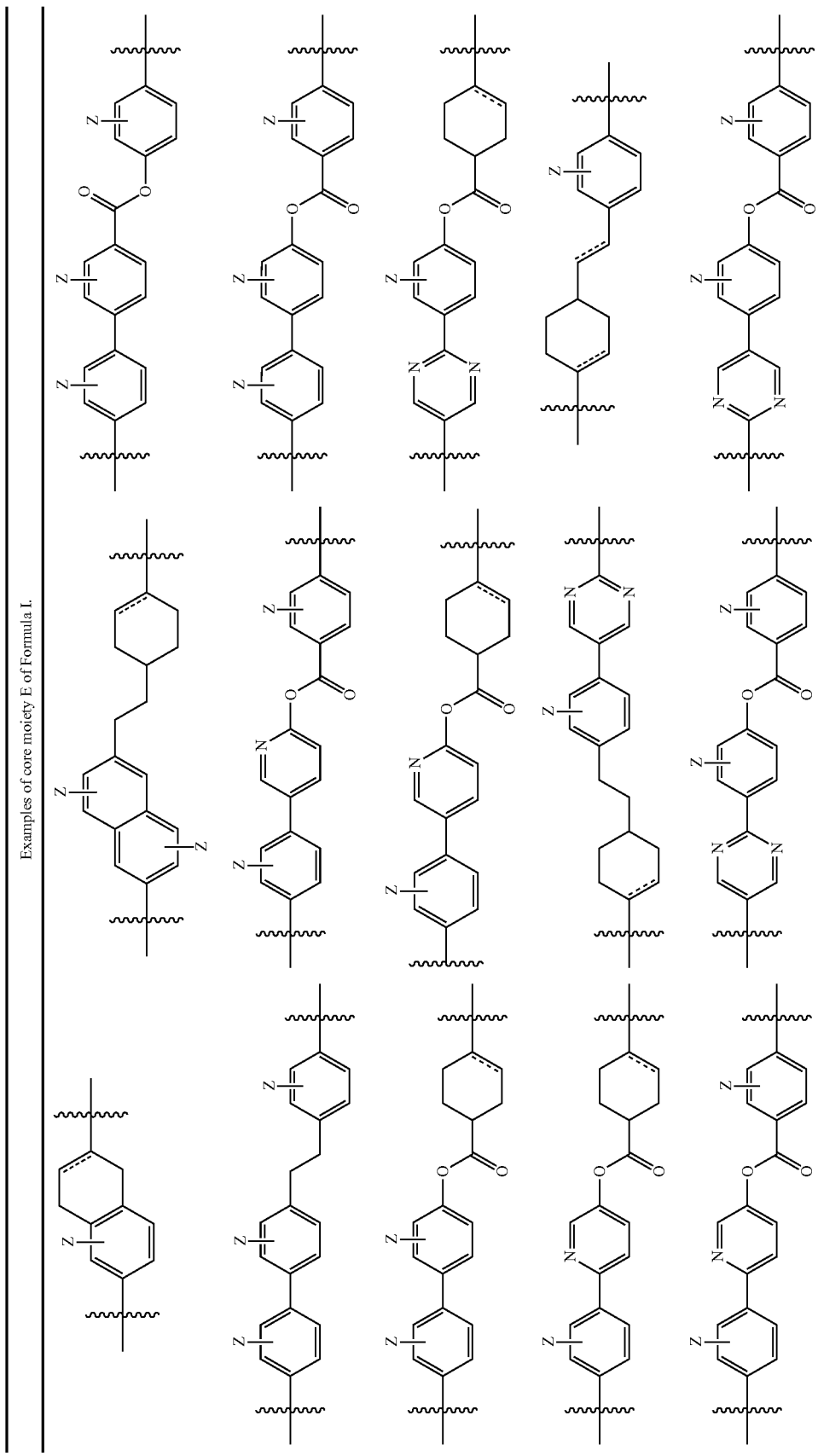

TABLE 1-continued
Examples of core moiety E of Formula I.
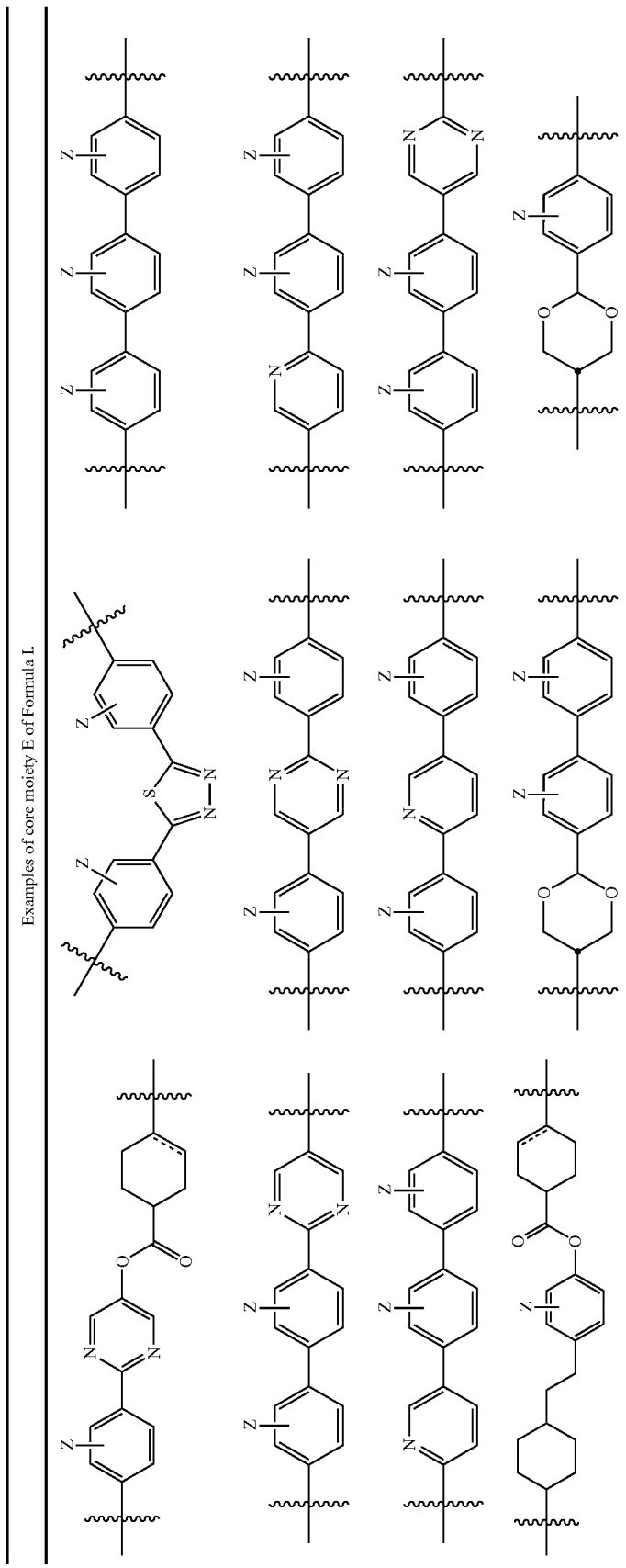

In one particular embodiment, D is a moiety of the formula:

$$R^1\text{-}[X]_a\text{-} \qquad \text{II}$$

where
a is 0 or 1;
X is O, S, C(=W), -Z-C(=W)—; —C(=W)-Z-, —C≡C—, or NR²;
W is O or S;
Z is O, S, or NR⁹;
R¹ is selected from alkyl, haloalkyl, heteroalkyl, alkenyl, alkynyl, heteroalkenyl, and heteroalkynyl, preferably R¹ is alkyl, haloalkyl, or heteroalkyl; and
each of R² and R⁹ is independently hydrogen, alkyl, or a nitrogen protecting group.

The term "heteroalkyl" refers to a saturated linear monovalent hydrocarbon moiety of one to twenty, preferably one to twelve, carbon atoms or a saturated branched monovalent hydrocarbon moiety of three to twenty, preferably three to twelve, carbon atoms, containing one or more heteroatoms in place of a carbon atom, or optionally one or more heteroatom-containing substituents independently selected from =O, —OR$^a$, —C(=O)R$^a$, —C(=S)—R$^a$, —C(=O)—O—R$^a$, —C(=S)—O—R$^a$, —C(=S)—S—R$^a$, —NR$^b$R$^c$, —C(=O)—NR$^b$R$^c$ and —S(O)$_n$R$^d$, where n is an integer from 0 to 2; R$^a$ is hydrogen, alkyl, haloalkyl, or acyl; R$^b$ is hydrogen, alkyl, haloalkyl, or acyl; R$^c$ is hydrogen, alkyl, haloalkyl, acyl, alkylsulfonyl, carboxamido, or mono- or di-alkylcarbomoyl; and R$^d$ is hydrogen (provided that n is 0), alkyl, haloalkyl, acyl, amino, monalkylamino, or dialkylamino. Optionally, R$^b$ and R$^c$ can be combined together with the nitrogen to which each is attached to form a four-, five-, six- or seven-membered heterocyclic ring (e.g., a pyrrolidinyl, piperidinyl or morpholinyl ring). Exemplary heteroalkylenes include, but are not limited to, methyleneoxy (—CH₂—O—), ethyleneoxy (—CH₂CH₂—O—), methoxymethylene (—CH₂—O—CH₂—), acylene (—CH₂—C(=O)—), acyloxylene (—CH₂—C(=O)—O—), and the like.

The term "heteroalkenyl" refers to a linear monovalent hydrocarbon moiety of two to twenty, preferably two to twelve, carbon atoms or a branched monovalent hydrocarbon moiety of three to twenty, preferably three to twelve, carbon atoms, containing at least one carbon-carbon double bond and one or more heteroatoms in place of a carbon atom, or optionally one or more heteroatom-containing substituents independently selected from =O, —OR$^a$, —C(=O)—R$^a$, —C(=S)—R$^a$, —C(=O)—O—R$^a$, —C(=S)—O—R$^a$, —C(=S)—S—R$^a$,—NR$^b$R$^c$, —C(=O)—NR$^b$R$^c$ and —S(O)$_n$R$^d$, where n is an integer from 0 to 2; R$^a$ is hydrogen, alkyl, haloalkyl, or acyl; R$^b$ is hydrogen, alkyl, haloalkyl, or acyl; R$^c$ is hydrogen, alkyl, haloalkyl, acyl, alkylsulfonyl, carboxamido, or mono- or di-alkylcarbomoyl; and R$^d$ is hydrogen (provided that n is 0), alkyl, haloalkyl, acyl, amino, monalkylamino, or dialkylamino. Optionally, R$^b$ and R$^c$ can be combined together with the nitrogen to which each is attached to form a four-, five-, six- or seven-membered heterocyclic ring (e.g., a pyrrolidinyl, piperidinyl or morpholinyl ring).

The term "heteroalkynyl" refers to a linear monovalent hydrocarbon moiety of two to twenty, preferably two to twelve, carbon atoms or a branched monovalent hydrocarbon moiety of three to twenty, preferably three to twelve, carbon atoms, containing at least one carbon-carbon triple bond and one or more heteroatoms in place of a carbon atom, or optionally one or more heteroatom-containing substituents independently selected from =O, —OR$^a$, —C(=O)—R$^a$, —C(=S)—R$^a$,—C(=O)—O—R$^a$, —C(=S)—O—R$^a$, —C(=S)—S—R$^a$, —NR$^b$R$^c$, —C(=O)—NR$^b$R$^c$ and —S(O)$_n$R$^d$, where n is an integer from 0 to 2; R$^a$ is hydrogen, alkyl, haloalkyl, or acyl; R$^b$ is hydrogen, alkyl, haloalkyl, or acyl; R$^c$ is hydrogen, alkyl, haloalkyl, acyl, alkylsulfonyl, carboxamido, or mono- or di-alkylcarbomoyl; and R$^d$ is hydrogen (provided that n is 0), alkyl, haloalkyl, acyl, amino, monalkylamino, or dialkylamino. Optionally, R$^b$ and R$^c$ can be combined together with the nitrogen to which each is attached to form a four-, five-, six- or seven-membered heterocyclic ring (e.g., a pyrrolidinyl, piperidinyl or morpholinyl ring).

The term "nitrogen protecting group" refers to a moiety, except alkyl groups, that when attached to a reactive nitrogen atom masks, reduces or prevents that reactivity. Examples of protecting groups can be found in T. W. Greene and P. G. M. Wuts, *Protective Groups in Organic Synthesis*, 3$^{rd}$ edition, John Wiley & Sons, New York, 1999, and Harrison and Harrison et al., *Compendium of Synthetic Organic Methods*, Vols. 1-8 (John Wiley and Sons, 1971-1996), which are incorporated herein by reference in their entirety. Suitable nitrogen protecting groups are well known to one skilled in the art. Representative nitrogen protecting groups include, but are not limited to, formyl, acetyl, trifluoroacetyl, benzyl, benzyloxycarbonyl (CBZ), tert-butoxycarbonyl (Boc), trimethylsilyl (TMS), 2-trimethylsilyl-ethanesulfonyl (SES), trityl and substituted trityl groups, allyloxycarbonyl, 9-fluorenylmethyloxycarbonyl (FMOC), nitro-veratryloxycarbonyl (NVOC), and the like.

In some embodiments, F is a moiety of the formula:

$$—[Y]_b—R^3—[Si(R^4)_2]_c—R^5—GeR^6R^7R^8 \qquad \text{III}$$

where
each of b and c is independently 0 or 1;
Y is O, S, C(=W), -Z—C(=W)-; —C(=W)-Z-, —C≡C—, or NR²;
W is O or S;
Z is O, S, or NR⁹;
each of R² and R⁹ is independently hydrogen, alkyl, or a nitrogen protecting group;
each of R³ and R⁵ is independently selected from the group consisting of alkylene, haloalkylene, heteroalkylene, alkenylene, alkynylene, heteroalkenylene, and heteroalkynylene;
each R⁴ is independently selected from the group consisting of hydrogen or C$_{1-4}$ alkyl; and
each of R⁶, R⁷, and R⁸ is independently C$_{1-4}$ alkyl.

The term "alkylene" refers to a divalent alkyl group.

The term "haloalkylene" refers to a divalent haloalkyl group.

The term "heteroalkylene" refers to a divalent heteroalkyl moiety. Exemplary heteroalkylenes include, but are not limited to, methyleneoxy (—CH₂—O—), ethyleneoxy (—CH₂CH₂—O—), methoxymethylene (—CH₂—O—CH₂—), acylene (—CH₂—C(=O)-), acyloxylene (—CH₂—C(=O)—O—), and the like.

The term "alkenylene" refers to a divalent alkenyl group.

The term "alkynylene" refers to a linear divalent hydrocarbon moiety of two to twenty, preferably two to twelve, carbon atoms or a branched divalent hydrocarbon moiety of three to twenty, preferably three to twelve, carbon atoms, containing at least one carbon-carbon triple bond. Exemplary alkynylene groups include, but are not limited to, ethynylene, propynylene, and the like.

The term "heteroalkenylene" refers to a divalent heteroalkenyl moiety.

The term "heteroalkynylene" refers to a divalent heteroalkynyl moiety.

In one particular embodiment, each of $R^6$, $R^7$, and $R^8$ is independently methyl, ethyl, or butyl.

Another aspect of the present invention provides a compound of the formula:

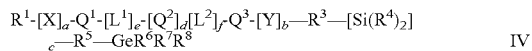

where
each of a, b, c, d, e, and f is independently 0 or 1;
each of X and Y is independently is O, S, C(=W), -Z—C(=W); —C(=W)-Z-, —C≡C—, or $NR^2$;
W is O or S;
Z is O, S, or $NR^9$;
$R^1$ is selected from alkyl, haloalkyl, and heteroalkyl;
each of $R^2$ and $R^9$ is independently hydrogen, alkyl, or a nitrogen protecting group;
each of $R^3$ and $R^5$ is independently selected from alkylene, haloalkylene, and heteroalkylene;
each $R^4$ is independently selected from hydrogen or $C_{1-4}$ alkyl;
each of $R^6$, $R^7$, and $R^8$ is independently $C_{1-4}$ alkyl;
each of $Q^1$, $Q^2$ and $Q^3$ is independently selected from cycloalkylene, heterocycloalkylene, cycloalkenylene, heterocycloalkenylene, arylene, and heteroarylene each of which is optionally substituted; and
each of $L^1$ and $L^2$ is a linker having from 0 to about 5 chain atoms.

In one particular embodiment, $R^1$ is $C_{4-15}$ alkyl or $C_{4-15}$ haloalkyl. Within this embodiment, preferably $R^1$ is hexyl, octyl, 2,3-difluorooctyl, 2-fluoro-2-methyloctyl, or decyl.

In some embodiments, a is 1. Within these embodiments, X is preferably O or S.

Yet still in other embodiments, each of $Q^1$, $Q^2$ and $Q^3$ is independently selected from phenylene, naphthylene, dihydronaphthylene, tetrahydronaphthylene, cyclyohexylene, dioxylene, pyridinylene, and pyrimidinylene, each of which is optionally substituted with one or two substituents. Preferably each substituents is independently selected from halide, alkyl, haloalkyl, alkoxide, haloalkoxide, nitro, cyano, amino, monoalkylamino, and dialkylamino. Within these embodiments, each of $Q^1$, $Q^2$ and $Q^3$ is preferably independently selected from phenyl-1,4-ene, 1,2,3,4-tetrahydronaphthyl-2,6-ene, 1,3-dioxyl-2,5-ene, pyridinyl-2,5-ene, and pyrimidinyl-2,5-ene, each of which is optionally substituted. Specific examples of these embodiments include those where each of $Q^1$, $Q^2$ and $Q^3$ is independently selected from phenyl-1,4-ene; pyridinyl-2,5-ene; pyrimidinyl-2,5-ene; fluorophenyl-1,4-ene; fluoropyridinyl-2,5-ene; fluoropyrimidinyl-2,5-ene; 2,3-difluorophenyl-1,4-ene; 1,2,3,4-tetrahydronaphthyl-2,6-ene; and 1,3-dioxyl-2,5-ene.

Some of the specific organogermanium compounds of the present invention are those where d is 0.

Other particular organogermanium compounds of the present invention include those where e is 0. Within these particular organogermanium compounds, preferably f is 0.

In other embodiments, each of the linkers $L^1$ and $L^2$ is independently selected from alkylene, alkoxylene, heteroalkylene, haloalkylene, carboxylate (—$CO_2$—), carbamoyl (—$CONR_a$—, where $R_a$ is hydrogen or alkyl), imidine (—N=), thiocarboxylate (—C(=S)—O—), and alkynylene. Preferred alkynylenes include acetylenylene (—C≡C—), and diacetylenylene (—C≡C—C≡C—).

Still in other embodiments, b is 1. Within these embodiments, preferably Y is O.

Yet in other embodiments of the present invention, $R^3$ is alkylene.

In other embodiments, c is 1. Within these embodiments, preferably each $R^4$ is independently methyl, isopropyl or butyl.

Other particular organogermanium compounds of the present invention include those where $R^5$ is alkylene.

Another aspect of the present invention provides liquid crystal compositions comprising an organogermanium compound in a starburst structure form. Starburst structures are well known in the art. Such structures can be formed, for example, by linking one or more organogermanium compounds to a 1,3,5-benzene core structure.

Liquid crystal compositions of the present invention also include dimers and/or trimers of organogermanium compound(s), which can be formed by linking or cross-linking one or more organogermanium compounds. Accordingly, the scope of the present invention also includes co-polymers, dimers and/or trimers of organogermanium compounds.

Liquid crystal compositions of the present invention are useful in various electronic devices that comprise a display element. In particular, organogermanium compounds of the present invention can be used, preferably in combination with other compounds, in liquid crystal display devices.

The present inventors have found that surprisingly and unexpectedly liquid crystal compositions comprising an organogermanium compound of the present invention show significantly less contraction of their smectic layers upon cooling from the smectic A phase to the smectic C phase compared to similar liquid crystal compositions that do not include any organogermanium compounds. It has been found that by adding about 20% of an organogermanium compound to a base liquid crystal composition otherwise without any organogermanium content layer contraction between smectic A phase to smectic C phase can be reduced from 10% for the base composition to less than 1% for the composition with 20% organogermanium content. In fact, in some organogermanium compositions of the present invention measurement of layer spacing in the smectic C phase showed layer expansion upon cooling. In some embodiments, adding about 20% of an organogermanium compound to a liquid crystal composition reduces the layer contraction between smectic A phase to smectic C phase of the liquid crystal composition, preferably to less than 10%, and more preferably to about 3% or less.

It has been found by the present inventors that organogermanium compounds are useful in producing liquid crystal compositions that exhibit many of the desirable properties. Some liquid crystal compositions of the present invention comprising one or more organogermanium compounds have improved properties including the presence of a deVries smectic A phase. The term "deVries" refers to the lack of (or smaller amount of) layer contraction when the LC cools from the orthogonal smectic A phase to the tilted Smectic C phase as compared to non-deVries LCs or FLCs. Accordingly, deVries FLCs do not contract as much as non-deVries FLCs upon cooling into the smectic C phase. Without being bound by any theory, it is believed that some of the liquid crystal compositions comprising an organogermanium compound have deVries behavior (i.e., reduced layer contraction compared to non-deVries materials). It is believed that organogermanium compounds of the present invention have the ability to induce substantial deVries behavior even when present as the minority fraction in a liquid-crystal composition that otherwise does not exhibit deVries behavior. In some embodiments, as little as 20% content of organogermanium compound(s) can be used to give a liquid-crystal composition with bookshelf or bookshelf-like layer structures that are believe to arise from the lack of layer shrinkage, where in the absence of the organogermanium compound(s) the similar composition exhibits chevron smectic layer structure with more highly tilted smectic layers.

In some embodiments of the present invention, liquid crystal compositions of the present invention exhibit relatively low director tilt angles in the range of 13°-29°, as is appropriate for conventional intensity-modulator applications of FLC devices, where the optimum director tilt angle is 22.5°, giving rise to a 45° difference in the orientations of the director or optic axis between ON and OFF states.

In other embodiments, liquid crystal compositions comprising an organogermanium compound exhibit relatively large director tilt angles of nearly 45°, as is appropriate for phase-modulator applications of FLC devices, where a 90° range of orientations is desired.

Initially it was believed that the structure of surface-stabilized ferroelectric liquid crystal devices that had the FLC layers were arranged in bookshelf geometry, such as is shown in FIG. 1A. It was later found that the smectic layers actually bend to form chevrons, such as is shown in FIG. 1B. The chevrons appear to play an important role in many aspects of FLC cell performance, including switching time, polarization, orientational viscosity, and contrast ratio.

One of the most important properties of a ferroelectric liquid crystal device effected by the chevron vs. bookshelf layer-structure variable is bistability, or the ability of the device to retain two optically distinct states with zero volts applied. The apparent optic-axis angle between the "memory" states of a device with a chevron layer structure are often rather small, whereas for a device with bookshelf layer structure the angle between the optic-axis directions of the memory states is often larger, approaching twice the material's tilt angle.

Without being bound by any theory, it is believed that improved bistability properties result from bookshelf or nearly bookshelf geometry, i.e., as the chevron layer-tilt angle is reduced the bistability properties are improved. A preferred method of attaining bookshelf geometry is to have a FLC material which, using an ordinary rubbed polymer as an alignment layer, can spontaneously form upright, un-bent layers.

Some causes of the layer-tilting in the chevron geometry are quite simple. For example, as the FLC material cools from the orthogonal smectic A phase to the tilted smectic C phase, the layers shrink as the molecules tilt over. Although the layers may have a bookshelf geometry in the smectic A phase, shrinkage as they cool into smectic C phase typically results in their forming the chevron geometry. By adding an organogermanium compound to a liquid crystal composition, the reduction of layer shrinkage observed by the present inventors results in maintaining a bookshelf geometry, or at least in the reduction of the layer tilt angle in a chevron geometry, thereby providing improved bistability properties.

An FLC cell which, in the absence of an electric field, can be left relatively indefinitely in either the ON or OFF position, with little change in the apparent optic-axis orientations is considered bistable. For an intensity-modulating FLC device with, for example, a 35°-40° difference between the ON-state and OFF-state apparent optic-axis orientations, it is preferred that the change in this orientation-difference be less than 15°, more preferably less than 5°, and still more preferably less than 2°. Bistability is typically measured optically, for example, an electric field is applied to the cell, then removed, and the optical response over time is measured. Such measurements are illustrated in the Examples section infra. Some of the liquid crystal compositions of the present invention are bistable.

Surprisingly and unexpectedly, some organogermanium compounds are more stable to ultraviolet light than similar non-organogermanium compounds. For example, under prolonged exposure to intense ultraviolet light, a typical non-organogermanium compound 2051 degraded by approximately 10% over 1800 hours, whereas the organogermanium compound 2183 degraded by only about 5%. Chemical structures of compound 2051 and 2183 are shown below:

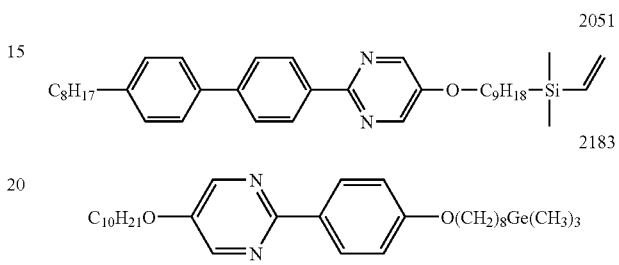

The light intensity of the UV flux averaged about 6.5 mW per square centimeter over the period of this study. Accordingly, in some embodiments, liquid crystal compositions of the present invention have higher UV stability than similar liquid crystal compositions that do not contain any organogermanium compound.

Synthesis of Organogermanium Compounds

The organogermanium compounds of the present invention can be prepared by a variety of methods. In one aspect of the present invention, a method for preparing organogermanium compounds is shown in Scheme 1 below. It should be appreciated that although the scheme often indicates exact structures, methods of the present invention apply widely to analogous organogermanium compounds, given appropriate consideration to protection and deprotection of reactive functional groups by methods standard to the art of organic chemistry. For example, hydroxy groups, in order to prevent unwanted side reactions, sometimes need to be converted to ethers or esters during chemical reactions at other sites in the molecule. The hydroxy protecting group is then removed to provide the free hydroxy group. Similarly, amino groups and carboxylic acid groups can be derivatized to protect them against unwanted side reactions. Typical protecting groups, and methods for attaching and cleaving them, are described fully in the above incorporated references of T. W. Greene and P. G. M. Wuts, *Protective Groups in Organic Synthesis*, 3$^{rd}$ edition, John Wiley & Sons, New York, 1999, and Harrison and Harrison et al., *Compendium of Synthetic Organic Methods*, Vols. 1-8 (John Wiley and Sons, 1971-1996).

A trialkylgermanium moiety can be inserted into C—Cl and C—O bonds using an insertion reaction. Suitable insertion reaction conditions are well known in the art. See, for example, *Jap. J. Appl. Physics Part 2-Letters &Express Letters*, Zhang, Q. C. et al., L1208-L1210, 2004, Vol. 43(9A-B); *IEEE J. Selected Topics In Quantum Electronics*, Dosunmu, O. I. et al., 694-701, 2004, Vol. 10(4); *Dalton Transactions*, Driess, M. et al., 3176-3177, 2004 (20); *Chem. Rec.*, Kira, M. et al., 243-253, 2004, Vol. 4(4); *J. Electroanal. Chem.*, Cattarin, S. et al., 257-265, 2004, Vol. 572(2); *Macromol.*, Kricheldorf, H. R. et al., 7955-7959, 2004, Vol. 37(21); *Organometal.*, El Kettani, S. E. C. et al., 5062-5065, 2004, Vol. 23(21); *J. Mat. Sci. & Tech.*, Fang, M. et al., 509-511, 2004, Vol. 20(5); *Can. J. Chem. Rev. Can. de Chim.*, Durig, J. R. et al., 964-977, 2004, Vol. 82(6); *J. Organomet. Chem.*, Takeuchi, Y. et al., 3275-3277, 2004, Vol. 689(20); *Mol. Cryst. Liq. Cryst.*, Young, et al. 305-321, 1971, Vol. 13; *Organometal.*, Filippou, A. C. et al., 4503-4512, 2004, Vol. 23(19); *Organogermanium compounds. Science of Synthesis*, Volume 4, Ed. M. Moloney et al., Stuttgart, 2002, 912 pp, €1750, ISBN 0-86577-944-9,3-13-112181-5; and U.S. Pat. No. 6,749,771, all of which are incorporated herein by reference in their entirety.

Specific examples of organogermanium compounds and some of the methods useful in preparing such compounds are illustrated below. One of the methods for preparing organogermanium compounds is hydrogermylation reaction as illustrated in Scheme 1 below.

Scheme 1.
Hydrogermylation to afford organogermanium compounds.

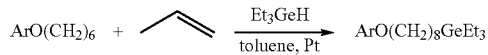

Hydrogermylation reaction involves a catalyst, typically platinum, mediated coupling reaction between a trialkylgermane compound and an olefin. Often the reaction is carried out in an inert solvent such as toluene at an elevated temperature, typically about 80° C. or above. Some of the representative organogermanium compounds prepared using hydrogermylation reaction are shown below, along with the isotropic (I), smectic C phase (SmC), smectic A phase (SmC), unidentified smectic phase (Sx), and/or crystal phase (X) temperatures. The number in the parenthesis indicates a temperature that the higher phase supercools to.

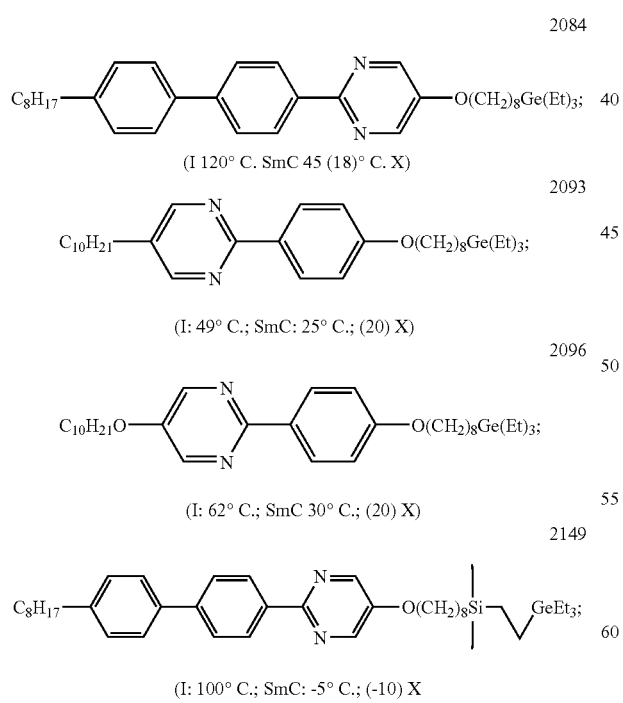

Compound 2149 contains both germanium and silicon atoms and results in a very broad SmC phase. It is also thermodynamically stable at room temperature.

Another method for preparing organogermanium compounds is a substitution reaction as illustrated in Scheme 2 below.

Scheme 2.
Alkyl tosylate-Grignard coupling.

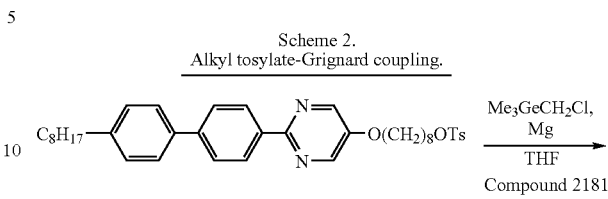

Typically, the substitution reaction is achieved by reacting an organogermanium Grignard reagent with a compound having a leaving group. Organogermanium Grignard reagent can be generated in situ or it can be separately prepared. Often the leaving group is a tosylate which can be readily prepared from its corresponding alcohol. Methods for converting an alcohol functional group to a tosylate leaving group is well known to one skilled in the art. The reaction is generally carried out in an inert solvent such as THF or other ether solvents. Often the reaction is carried out at room temperature or below, typically at about 0° C. or −20° C. Some of the representative organogermanium compounds prepared using a substitution reaction are shown below, along with the isotropic (I), smectic C phase (SmC), and smectic A phase temperatures, where known.

Another method for preparing organogermanium compounds is a germanium insertion reaction as illustrated in Scheme 3 below.

In a germanium insertion reaction, a germanium moiety is inserted into C—X bond, where X is halide, typically chloride. Often, commercially available dichlorogermanium dioxane complex is used. In such cases, dioxane is typically used as the reaction solvent. The reaction generally involves heating a mixture of dichlorogermanium dioxane and an alkyl halide. The reaction is generally carried out at an elevated temperature, often around 140° C. After the initial insertion reaction, the resulting mixture is treated with a desired alkyl magnesium halide (i.e., alkyl Grignard reagent) to produce the desired organogermanium compound.

Organogermanium compounds often undergo various organic reactions similar to the corresponding nonorganogermanium compounds that are well known to one skilled in the art, such as an esterification reaction illustrated in Scheme 4 below. In this manner, a wide variety of organogermanium compound can be prepared.

Scheme 4.
Standard esterification reaction to form the three ring organogermanium compound.

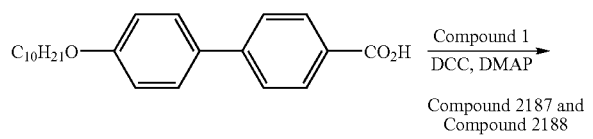

Compound 2187 and Compound 2188

As illustrated in Scheme 4 above, compound 1, which is prepared using the reaction illustrated in Scheme 3 above, is subjected to a typical esterification reaction with a bisphenyl benzoic acid to generate compound 2187 (R=methyl) and compound 2188 (R=isopropyl). Some of the representative organogermanium compounds prepared using this reaction are shown below, along with the isotropic (I), smectic C phase (SmC), and smectic A phase temperatures, where known.

2187

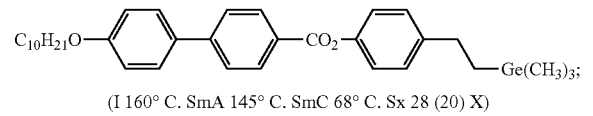

(I 160° C. SmA 145° C. SmC 68° C. Sx 28 (20) X)

2188

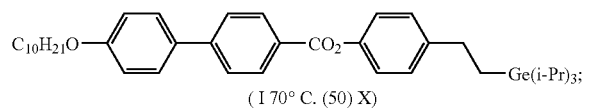

(I 70° C. (50) X)

2205

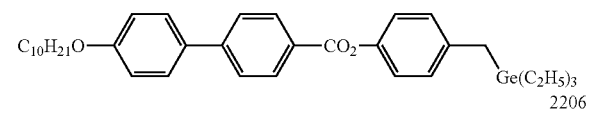

2206

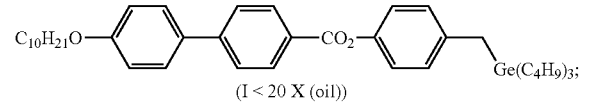

(I < 20 X (oil))

2207

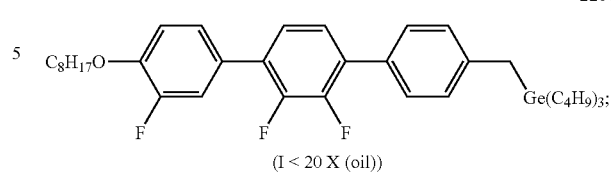

(I < 20 X (oil))

2208

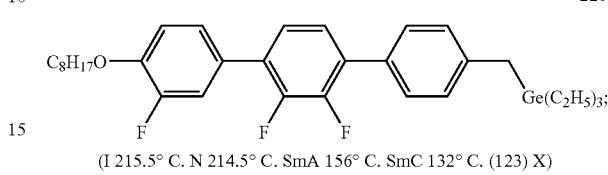

(I 215.5° C. N 214.5° C. SmA 156° C. SmC 132° C. (123) X)

2209

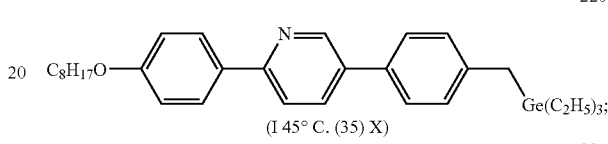

(I 45° C. (35) X)

2210

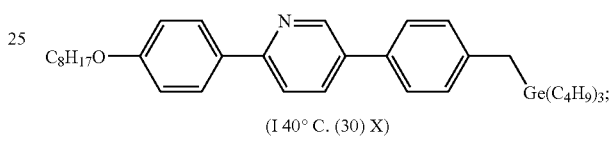

(I 40° C. (30) X)

Compounds 2187 and 2188 can also be prepared as follow: germanium insertion reaction:

PhCH$_2$CH$_2$Cl+GeCl$_2$·dioxane complex→PhCH$_2$CH$_2$GeCl$_3$

This intermediate is then reacted with a desired Grignard reagent to afford the trialkyl organogermanium compound such as PhCH$_2$CH$_2$GeMe$_3$ (compound 2187). In this manner, a wide variety of organogermanium compounds can be prepared.

Compounds 2205 through 2210 were prepared by previously undiscovered reaction involving a germanium halide and an aralkyl ether compound as illustrated in Scheme 5 below.

Scheme 5.
Reaction of a germanium halide with a benzyl ether derivative.

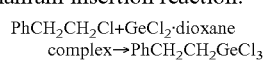

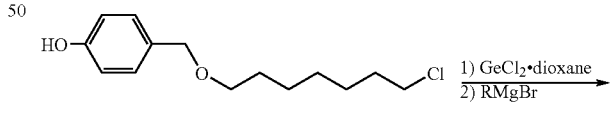

II

In the presence of an aralkyl ether functional group, the germanium insertion reaction with an alkyl halide similar to that used in preparation of compounds 2187 and 2188 gave an unexpected product as shown in Scheme 5 above. Typically, it is expected that a germanium halide will insert in the a C—Cl bond. However, when the organo halide compound also contains an aralkyl ether (e.g., benzyl ether) moiety, surprisingly and unexpectedly the germanium insertion reaction was observed at the ether moiety to generate compound II rather than the expected C—Cl insertion product. Compound II can then be used in a variety of coupling reactions to afford a wide variety of previously unobtainable organogermanium compounds. Some of the representative organogermanium compounds prepared using this reaction are shown below, along with the isotropic (I), smectic C phase (SmC), and smectic A (SmA) phase temperatures, where known.

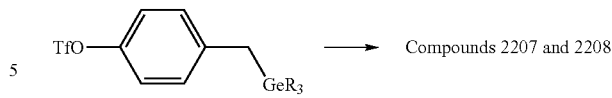

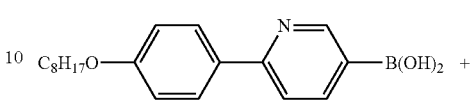

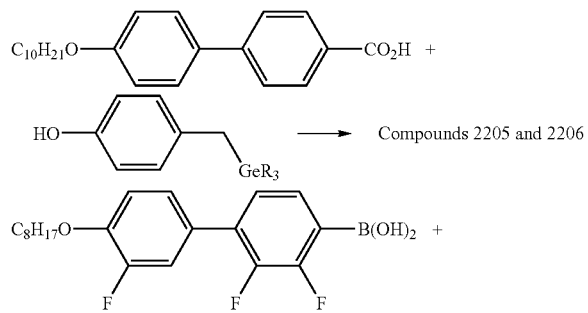

Compound 2207 showed surprisingly wide SmC phase (80° C. wide) as well as exhibiting the SmA phase and the nematic phase. Some of the other representative organogermanium compounds of the present invention are shown in Table 1 below.

TABLE 1

Representative organogermanium compounds

| Compound No. | Structure |
|---|---|
| 2290 | 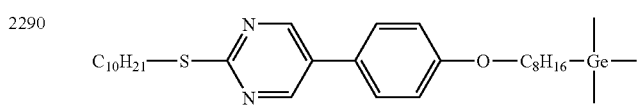 |
| 2310 | 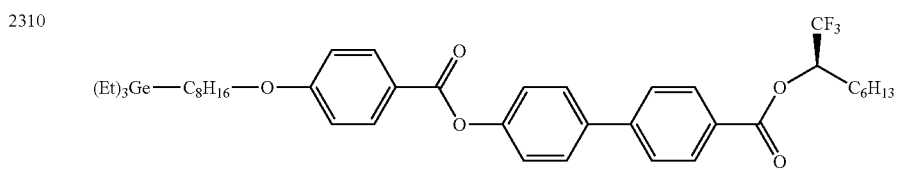 |
| 2312 | 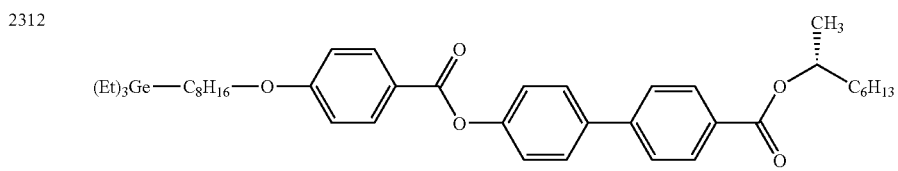 |
| 2313 | 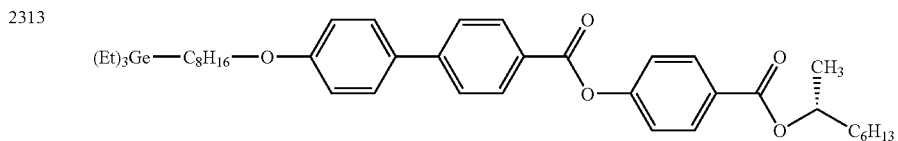 |
| 2315 | 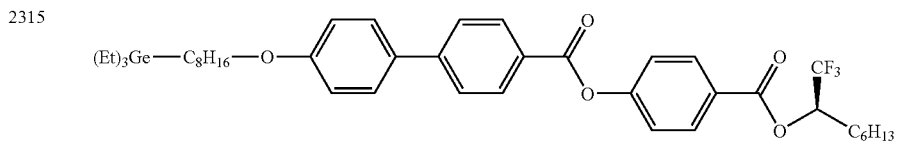 |

TABLE 1-continued
Representative organogermanium compounds
Compound No. Structure
2332
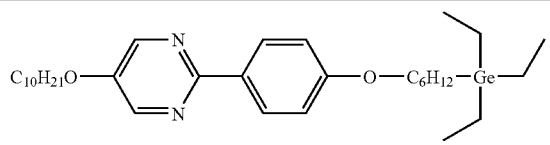
2333
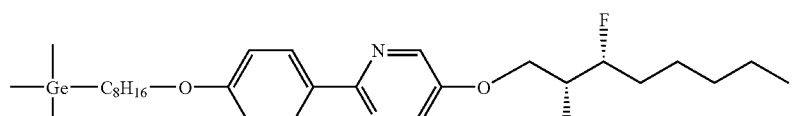
I 99.9 A 94 C 88 SmX1 84 (78 SmX2 77) X
2334
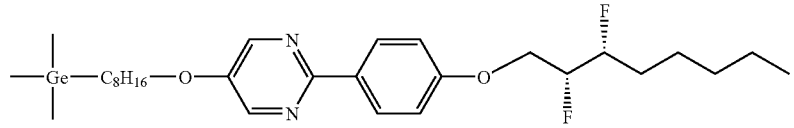
I 97 (84) X
2335
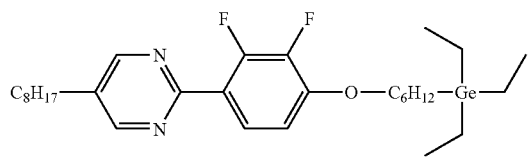
I <25 X (oil)
2336
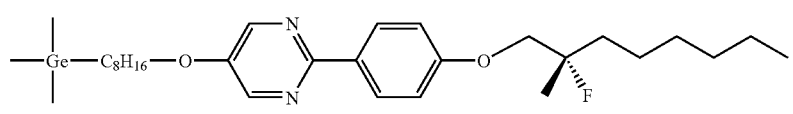
I 49 (29) X
2339
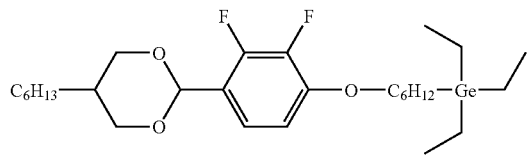
I <25 X (oil)
2340
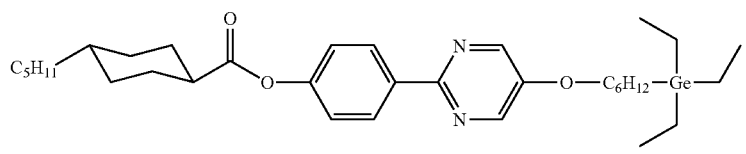
I 114.4 N 92 C 87 (66.4) X
2341
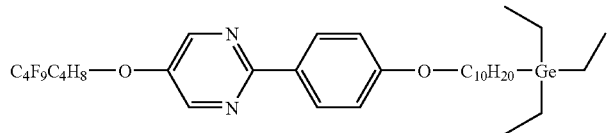
I 89.3 A 83.2 C 60 (42.5) X
2342
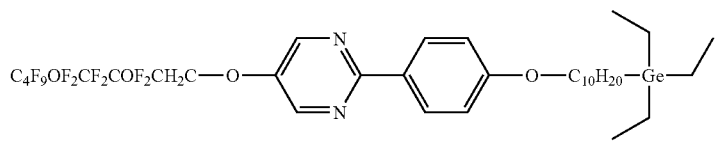

TABLE 1-continued

Representative organogermanium compounds

| Compound No. | Structure |
|---|---|
| 2343 | Triethylgermyl-C$_8$H$_{16}$-O-[phenyl]-[pyrimidine]-O-CH$_2$-C*(CH$_3$)(F)-C$_6$H$_{13}$<br>I <25 X (oil) |
| 2344 | Triethylgermyl-C$_8$H$_{16}$-O-[phenyl]-C(O)O-[tetrahydronaphthyl]-C(O)-O-C$_{10}$H$_{21}$<br>I <25 X (oil) |

Additional objects, advantages, and novel features of this invention will become apparent to those skilled in the art upon examination of the following examples thereof, which are not intended to be limiting.

EXAMPLES

Example 1

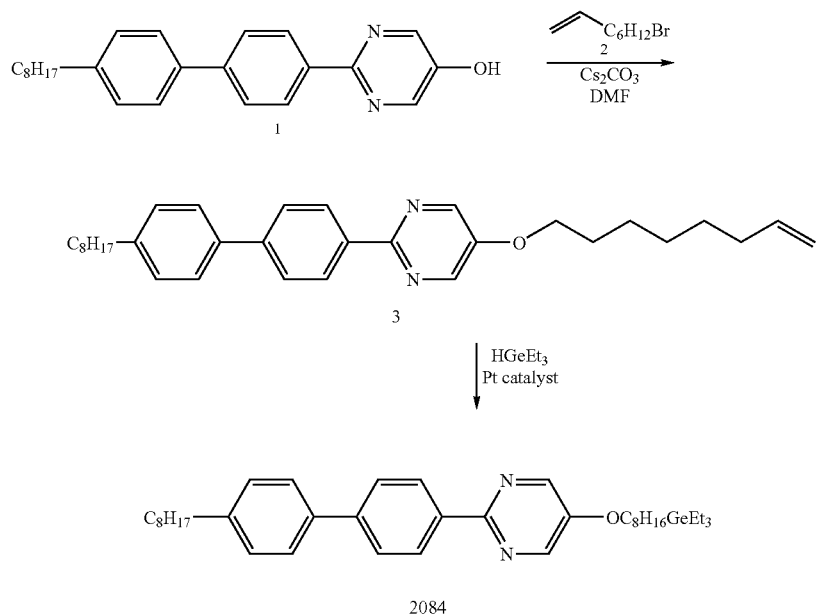

Step 1

Cesium carbonate (1.1 eq.) was added to the solution of phenol compound 1 (1 eq.) and bromooctene compound 2 (1 eq.) in N,N-dimethylformamide (3 ml/mole phenol) at room temperature. The resulting mixture was stirred overnight and extracted with ethyl acetate:hexane (1:1). The organic layer was separated, washed successively with water and brine, dried over magnesium sulfate, concentrated, and purified via silica gel chromatography eluting with 5% ethyl acetate in hexane to give compound 3 in 86% yield.

Step 2

A nitrogen gas was bubbled through the solution of compound 3 (1 eq.), triethylgermane (2.5 eq.), and platinum (0)-1,3-dimethyl-1,1,3,3-tetramethyldisilane (complex solution in xylenes) (0.02 eq.) in toluene 5 ml/mole for 10 minutes. The resulting mixture was stirred at 80° C. for 15 hours, concentrated, and purified via silica gel chromatography eluting with 4% ethyl acetate in hexane to give compound 2084 in 60% yield.

Examples 2 and 3

Compounds 2093 and 2096 were prepared using the procedure of Example 1 in about 65% yield.

Example 4

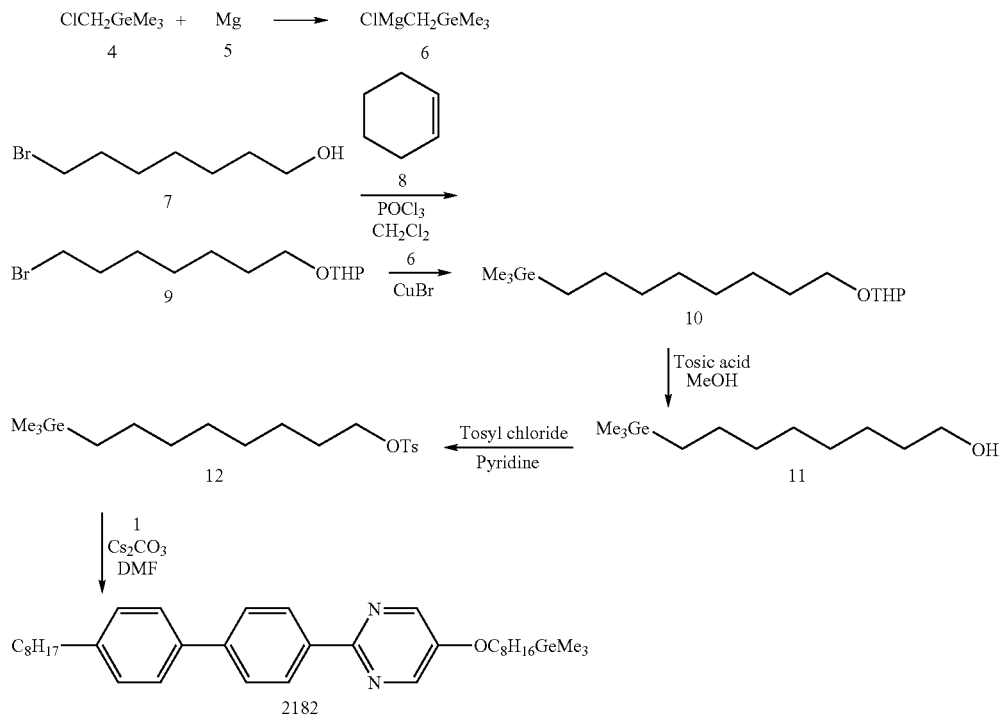

Step 1
To a dry 250 mL 3-neck flask containing flat Mg metal (1 equi.) was added 10 mL of THF. After stirring for 30 minute, dibromoethane (0.05 eq.) was added to the mixture and the resulting mixture was heated until the reaction was observed by formation of rapid bubbles and gray color. To this mixture was then added dry ZnCl$_2$ (0.07 eq.), and a solution of trimethylgermane compound 4 (1 eq.) in THF at a rate that kept the reaction flask warm. After addition was completed, the mixture was heated at 80° C. for 3 hours. The reaction mixture was then cooled and the clear solution was transferred for storage until needed.

Step 2
To a room temperature solution of commercially available 7-bromoheptan-1-ol 7 (1 eq.) and 3,4-dihydropyran 8 (1.5 eq.) in dichloromethane (3 mL/mole of 7) was added phosphorous oxychloride (0.01 eq.). The reaction mixture was stirred for 24 h. To the resulting mixture was added potassium carbonate (1 eq.), and the mixture was stirred at room temperature for 1 h, quenched with water, and extracted with dichloromethane. The organic layer was separated, washed with brine, dried over MgSO4, concentrated, and purified via chromatography on silica gel (5% EtOAc/hexanes) affording compound 9 as a colorless oil (96%).

Step 3
Grignard solution 6 (1.1 eq.) was added to a solution of compound 9 (1 eq.) and copper bromide in THF at 0° C. The reaction mixture was stirred at room temperature for 12 h, quenched with 5% aqueous ammonium chloride, and extracted with ethyl acetate:hexane (1:1). The organic layer was separated, washed successively with water and brine, dried over magnesium sulfate, concentrated, and purified via chromatography over silica gel eluting with 5% ethyl acetate in hexane affording compound 10 in 85% yield.

Step 4
To a solution of compound 10 (1 eq.) and commercially available para-toluenesulfonic acid (0.1 eq.) in methanol:THF (1:1) (3 mL/mmole of compound 10), water (0.005 eq.) was added at room temperature. The reaction mixture was stirred for 24 h, quenched with water, and extracted with ethyl acetate:hexane (1:1). The organic layer was separated, washed with brine, dried over MgSO$_4$, concentrated, and purified by chromatography on silica gel (10% EtOAc/hexanes) affording compound 11, as a colorless oil (96%).

Step 5
Tosyl chloride (1.1 eq.) was added to the solution of alcohol compound 11 (1 eq.) in pyridine at 0° C. The resulting mixture was stirred for 2 hours and then kept at -20° C. overnight. Tetrahydrofuran (3 mL/mole of alcohol) and aqueous ammonia (0.1 eq.) was added to the reaction mixture and stirred for 20 minutes. The resulting mixture was extracted with ethyl acetate:hexane (1:1). The organic layer was separated, washed successively with cold 10% aqueous hydrochloric acid, water and brine, dried over magnesium sulfate, concentrated, and filtered through silica gel eluting with 10% ethyl acetate in hexane to give tosylate compound 12 in 87% yield.

Step 6
Cesium carbonate (1.1 eq.) was added to a room temperature solution of the commercially available phenol 1 (1 eq., see Example 1 above) and compound 12(1 eq.) in N,N-dimethylformamide (3 mL/mole of phenol). The mixture was stirred at room temperature overnight and then extracted with ethyl acetate:hexane (1:1). The organic layer was separated, washed successively with water and brine, dried over magnesium sulfate, concentrated, and purified via silica gel chromatography eluting with 5% ethyl acetate in hexane to afford compound 2182 in 62% yield.

Examples 5-7

Compounds 2181 (80% yield), 2183 (59% yield), and 2290 (67% yield) were prepared using the procedure described above in Example 5.

Examples 8-9

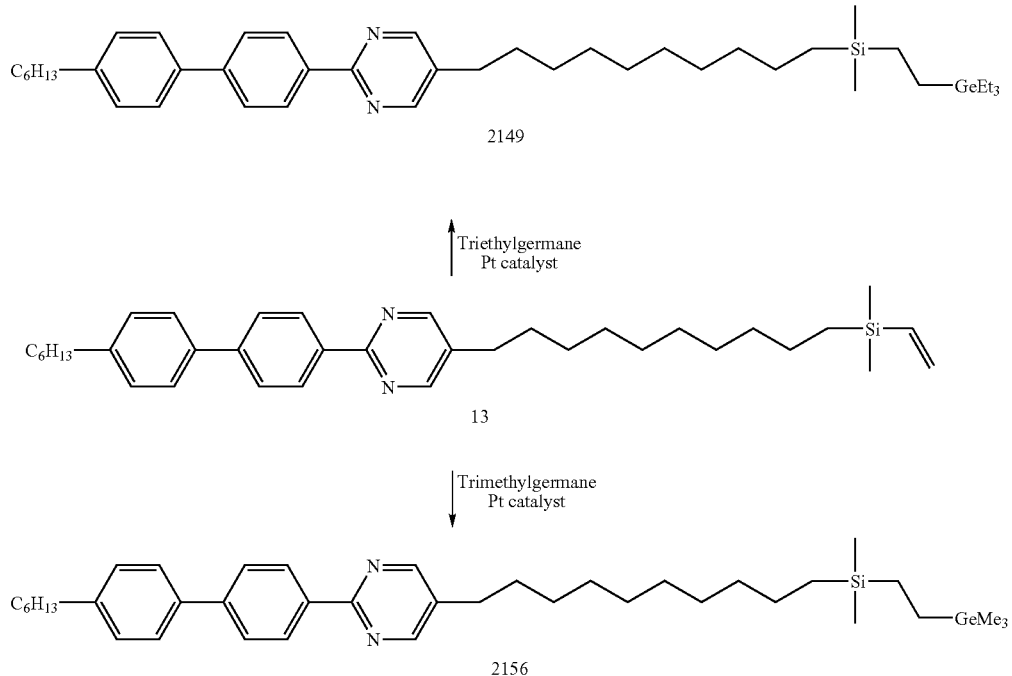

Compounds 2149 (yield 67%) and 2156 (yield 89%) were prepared from compound 13 and the appropriate trialkylgermane compound using the procedure described in Step 2 of Example 1 above.

Example 10

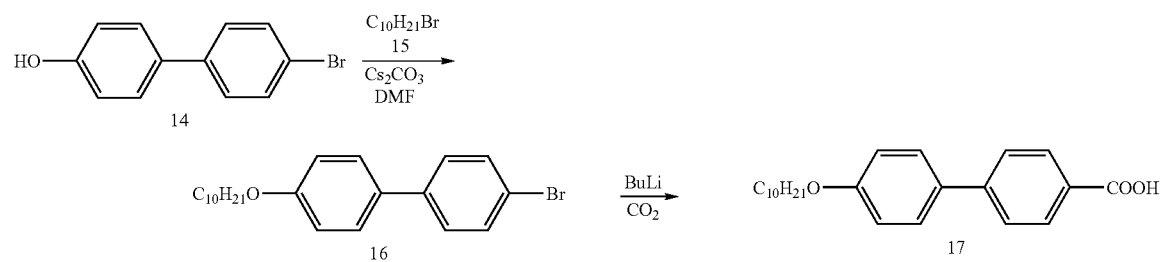

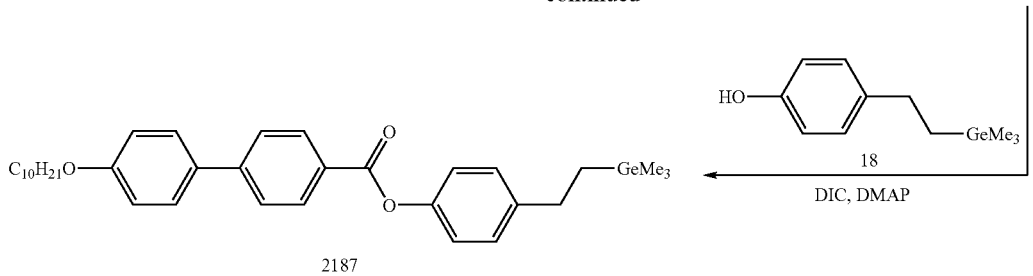

Step 1

Cesium carbonate (1.1 eq.) was added to a room temperature solution of the commercially available phenol compound 14 (1 eq.) and bromodecane 15 (1 eq.) in DMF (3 mL/mole of phenol). The mixture was stirred at room temperature overnight and then extracted with ethyl acetate:hexane (1:1). The organic layer was separated, washed successively with water and brine, dried over magnesium sulfate, concentrated, and purified via chromatography over silica gel eluting with 5% ethyl acetate in hexane to afford compound 16 in 91% yield.

Step 2

To a −78° C. solution of compound 16 (1 equi.) in THF (5 mL/mmole of compound 16) was added butyllithium (1.3 eq.). The resulting mixture was stirred at −78° C. for 2 h and then solid $CO_2$ was added. The mixture was extracted with ethyl acetate. The organic layer was separated and washed with 10% aqueous sodium hydroxide solution. The aqueous layer was separated and acidified with 10% hydrochloric acid solution and extracted with ethyl acetate. The organic layers were combined, washed with brine, dried over $MgSO_4$, and concentrated to give acid compound 17 as a white solid (88%).

Step 3

To a room temperature solution of acid compound 17 (1 eq.), compound 18 (1 eq.), and dimethylaminopyridine (DMAP) (0.1 eq.) in THF (2.5 mL/mmole of compound 17) was added diisopropyl carbodiimide (DIC) (1.2 eq.). The resulting mixture was stirred at room temperature for 24 h, quenched with water, and extracted with ethyl acetate:hexane (1:1). The organic layer was washed with brine, dried over $MgSO_4$, concentrated, and purified by chromatography on silica gel (5% EtOAc/hexanes) to afford compound 2187 as a white solid (70%).

Examples 11-12

Compounds 2205 (89% yield) and 2206 (75% yield) were prepared using the procedure of Example 10.

Example 13

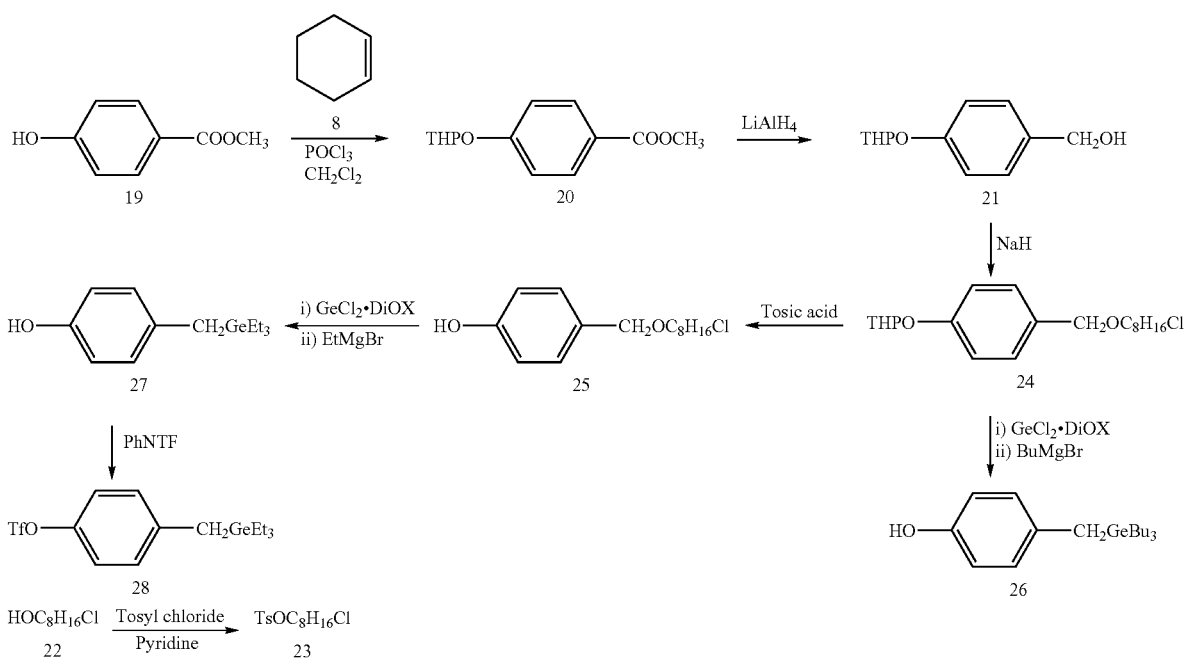

Step 1

Compound 20 was prepared from commercially available compounds 19 and 8 as described in Step 1 of Example 4 in 86% yield.

Step 2

To a 0° C. slurry of lithium aluminum hydride (LAH) (2 eq.) in THF (3 mL/mmole of LAH) was added a solution of ester compound 20 (1 eq.) in THF (3 mL/mmole of compound 20) over a period of 20 min. The resulting mixture was stirred at room temperature for 24 h, cooled with an ice-water bath, diluted with diethyl ether (20 mL/mmole of LAH), quenched by successively adding water (1 mL/g of LAH), 15% aqueous sodium hydroxide (1 mL/g LAH), and water (3 mL/g LAH). To the resulting solution was then added $MgSO_4$ (5 g/100 mL of resulting solution) and stirred for 30 min. The mixture was then filtered through a pad of celite and the filtrate was concentrated to give compound 21 a colorless oil in 89% yield.

Step 3

Tosylate 23 was prepared from compound 22 using the procedure of Step 5 of Example 4 (for preparation of compound 12) in 88% yield.

Step 4

Sodium hydride (1 eq.) was added to a room temperature solution of compound 21 (1 eq.) and compound 23 (1 eq.) in DMF (1 mL/mmole), and the resulting mixture was stirred for 12 h. The mixture was quenched with water and extracted with ethyl acetate:hexane (1:1). The organic layer was washed with brine, dried over $MgSO_4$, concentrated, and purified by chromatography on silica gel (20% EtOAc/hexanes) to afford compound 24 as a colorless oil in 23% yield.

dioxane complex (1 eq.), in dioxane (0.5 mL/mole) for 10 minutes. The mixture was then stirred at 140° C. for 15 hours and then concentrated. The resulting residue was dissolved in toluene and cooled to 0° C. To the resulting solution was added ethyl magnesium bromide (2 M THF solution, 4 eq.) and copper bromide. The resulting mixture was stirred at 80° C. for 12 h, quenched by adding 5% aqueous ammonium chloride solution, and extracted with ethyl acetate:hexane (1:1). The organic layer was washed successively with water and brine, dried over magnesium sulfate, concentrated, and purified via chromatography over silica gel eluting with 10% ethyl acetate in hexane to give compound 27 as a colorless oil in 28% yield.

Step 7

To a −78° C. solution of compound 27 (1 eq.) and N-phenyl trifluoromethanesulfonamide (1 eq.) in dichloromethane (10 mL/mmole) was added triethylamine (1.5 eq.). The resulting mixture was stirred at −78° C. for 1 h and at room temperature for 24 h. The reaction mixture was quenched with water and extracted with ethyl acetate:hexane(1:1). The organic layer was separated, washed with brine, dried over $MgSO_4$, concentrated, and purified via chromatography on silica gel (5% EtOAc/hexanes) to afford compound 28 as a colorless oil (51% yield).

Step 8

Compound 31 was prepared from commercially available compound 30 using the procedure for preparing compound 16 (see Example 10) in yield 96%.

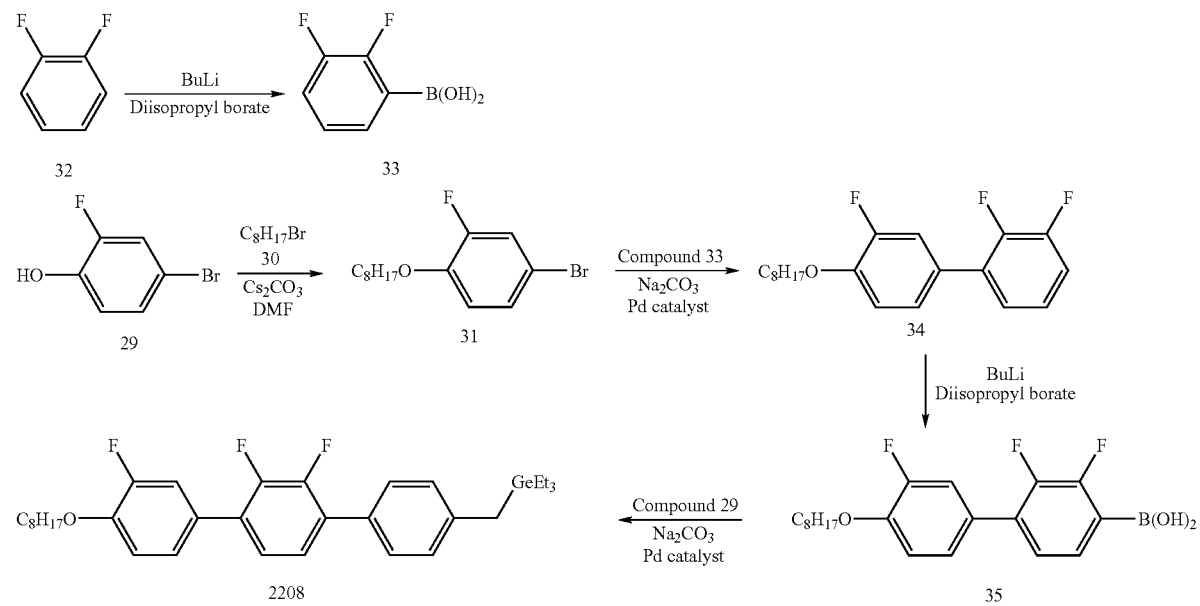

Step 5

Phenol compound 25 was prepared from compound 24 using the procedure of Step 4 of Example 4 (as described in preparation of compound 11) in 78% yield.

Step 6

Nitrogen gas was bubbled through a solution of compound 25 (1 eq.) and commercially available dichlorogermanium Step 9

To a −78° C. solution of compound 32 (1 eq.) in THF (5 mL/mmole) was added butyllithium (1.3 eq.). The resulting mixture was stirred at −78° C. for 2 hr., and then triisopropylborate (1 eq.) was added. The resulting mixture was stirred at −78° C. for additional 1 h and at room temperature for 10 h. The reaction mixture was diluted with water and extracted with ethyl acetate. The organic layer was separated, washed with brine, dried over MgSO$_4$, concentrated, and purified via recrystallization from hexane to afford compound 33 as a white solid (64% yield).

Step 10

A biphasic solution of compound 33 (1.2 eq.), compound 31 (1 eq.), sodium carbonate (2.7 eq.), and tetrakis(triphenylphoshine)palladium catalyst (0.01 eq.) in water-toluene (1:1) (2 mL/mmole) was stirred at 100° C. for 12 h. The mixture was then cooled to room temperature and extracted with ethyl acetate:hexane(1:1). The organic layer was washed with brine, dried over MgSO$_4$, concentrated, and purified by chromatography on silica gel (5% EtOAc/hexanes) to afford compound 34 as a colorless oil (79% yield).

Step 11

Compound 35 was prepared from compound 34 as described in Step 9 (for preparation of compound 33) above in 57% yield.

Step 12

Compound 2208 was prepared from compounds 35 and 29 as described in Step 10 (for preparation of compound 34) in yield 63%.

Examples 14-16

Compounds 2207 (52% yield), 2209 (47% yield), and 2210 (37% yield) were prepared using the procedure of Example 13 for the preparation of compound 2208.

Example 17

Step 1

Toylate compound 37 was prepared from alcohol compound 36 using the procedure of Example 4 (for preparation of compound 12) in 80% yield.

Step 2

Compound 38 was prepared from compound 37 and triethylgermane as described in Step 2 of Example 1 (for preparation of compound 2084). Yield 82%.

Step 3

Compound 39 was prepared from phenol compound 19 and compound 38 as described in Step 1 of Example 1 (for preparation of compound 3) in 95% yield.

Step 4

A solution of compound 39 (1 eq.) and potassium hydroxide (3.5 eq.) in water-ethanol (1:1) (25 mL/mmole) was stirred at 80° C. for 2 h. The resulting mixture was cooled to room temperature, quenched with hydrochloric acid (5% solution). The resulting white solid was filtered, washed with water, and dried under vacuum to give acid compound 40 as a white solid (90%).

Step 5

Compound 2310 was prepared from acid compound 40 and phenol compound 41 (A. C. Spivey et al, *Chem. Commun.*, 1999, 835-836) as described in Step 3 of Example 10 (for preparation of compound 2187) in 79% yield.

Example 18-20

Compounds 2312 (76% yield), 2313 (71% yield), and 2315 (73% yield) were prepared using the procedure described in Example 17 (for preparation of compound 2310).

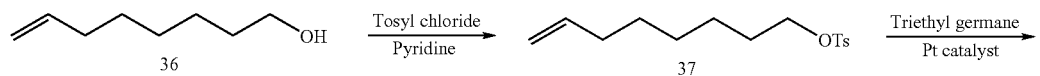

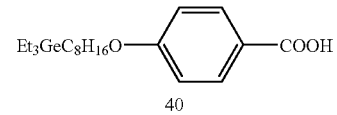

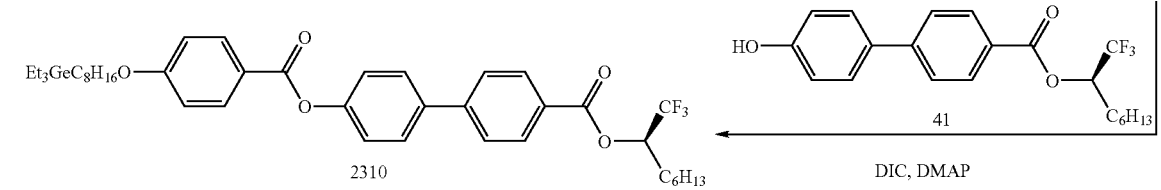

Example 21-33

Various liquid crystal compositions comprising one or more organogermanium compounds were prepared and are shown below:

| Composition of liquid crystal compositions comprising organogermanium compound | | | |
|---|---|---|---|
| Organogermanium Compound | Mixture No. | Type | % in MX10155 |
| 2093/2096 | 10357 | $RXPmPhOC_8GeEt_3$ X = single bond or O | 20 |
| 2096 | 10439 | $ROPmPhOC_8GeEt_3$ | 50 |
| 2149 | 10440 | $C_6PhPhPmC_{10}SiC_2GeEt_3$ | 50 |
| 2156 | 10441 | $C_6PhPhPmC_{10}SiC_2GeMe_3$ | 50 |
| 2182 | 10442 | $C_8PhPhPmOC_8GeMe_3$ | 50 |
| 2183 | 10443 | $ROPmPhOC_8GeMe_3$ | 50 |
| 2187 | 10444 | $C_{10}PhPhCO_2PhC_2GeMe_3$ | 50 |
| 2188 | 10445 | $C_{10}PhPhCO_2PhC_2Ge(i-Pr)_3$ | 50 |
| 2208/2209 | 10447 | $C_8OPhFPhF_2PhC_1GeEt_3$ | 100 |
| 2207 | 10448 | $C_8OPhFPhF_2PhC_1GeBu_3$ | 50 |
| 2208 | 10449 | $C_8OPhFPhF_2PhC_1GeEt_3$ | 50 |
| 2209 | 10450 | $C_8OPhPyPhC_1GeEt_3$ | 50 |
| 2210 | 10451 | $C_8OPhPyPhC_1GeBu_3$ | 50 |

Py refers to pyrimidine, Pm refers to pyrimidine, and $C_n$ refers to a straight carbon chain of n carbons. When not specified, R is a $C_{1-20}$ alkyl or haloalkyl. MX 10155 is a conventional phenylpyrimidine host, see Example 35 for more details. MX10447 is a liquid crystal composition comprising only organogermanium compounds.

Example 34

Bistability

Figure 2:
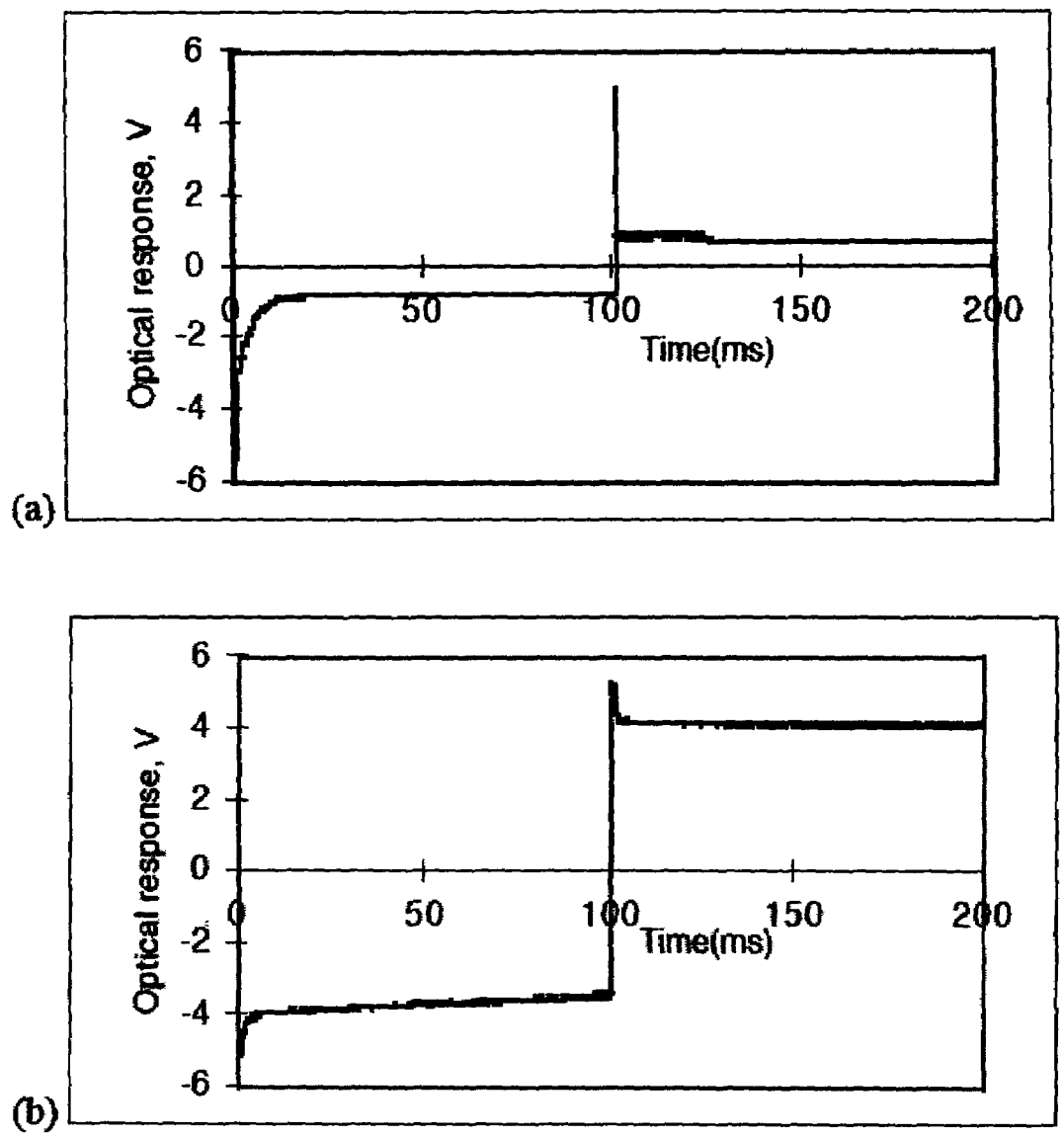
FIGS. 2A and 2B show the optical response over time of a conventional FLC cell and a bistable FLC cell, respectively, using the pulse pattern ±6V for 500 μs, then 100 ms @0V.

The response of a typical cell made with a conventional FLC material is shown in FIG. 2A, and that of a bistable FLC cell is shown in FIG. 2B. Both cells were driven with a ±6V pulse for 400 µs, then left at 0V for 100 ms. As seen in FIG. 2A, the optical response of the conventional cell, after both a positive and a negative pulse, quickly went to an equilibrium position, typically 10-40% of the maximum optical throughput, resulting in a dramatic decrease in light efficiency. In contrast, as shown in FIG. 2B, the optical response of the bistable cell dropped off about 10% from its peak position, but after that there was almost no signal degradation, which is critical for image retention without applied power.

Example 35

X-Ray Measurements of FLCs Comprising an Organogermanium Compound

Conventional Liquid Crystal Composition

Figure 3:
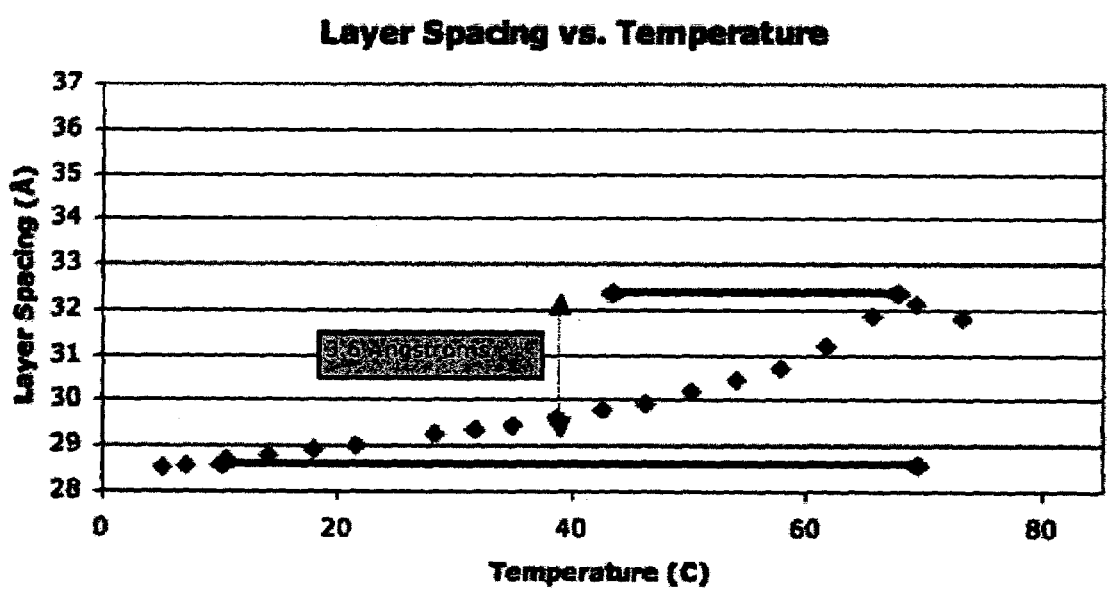
FIG. 3 is a layer-spacing versus temperature graph of a conventional phenylpyrimidine FLC host mixture.

To demonstrate the normal degree of contraction for a conventional FLC, MX10155 was formulated. MX10155 is a mixture, comprising, in mole percents, 23.1% $C_8PmPhOC_{12}$, 26.1% $C_9PmPhOC_8$, 27% $C_7PmPhOC_8$, 12.8% $C_{10}PmPhOCOCyC_5$, and 11% $C_8OPmPhOC_6$, where Cy refers to cyclohexyl. MX10155 forms a eutectic mixture affording the phase diagram, I-N-SmA-SmC. This particular mixture has no chiral dopants and is acceptable to this layer comparison experiment. The x-ray thickness of the FLC layers vs. temperature from above the isotropic point to well below room temperature was measured. The resulting graph affords a very good understanding of classical layer contraction characteristics. FIG. 3 shows the layer contraction behavior of this conventional FLC.

MX10155 contains no chiral molecules. Its phase diagram is: I 85 N 71 SmA 71 SmC 65-10 X. The nematic phase is invisible to the x-rays, which is typical, because there are no layers. The next phase is the SmA phase which showed a slight expansion. The point at which the layers began to contract closely matched the optical transition to the SmC phase, about 71° C.

A small amount of chiral dopant was used in order to measure the electro-optic characteristics. Generally, no increase in viscosity was observed compared to standard phenylpyrimidines-based FLC mixtures.

Liquid Crystal Composition Comprising an Organogermanium Compound

Several features were examined in the liquid crystal composition comprising an organogermanium compound. The first was miscibility. The DSC showed clean transitions instead of broad peaks indicating that organogermanium compound was miscible with other components of liquid crystal composition.

The SmC phase suppression was also examined. Without being bound by any theory, it is believed that if the compounds are truly compatible, then the SmC transition temperature will remain the same, and in some instances can be elevated. Many mixtures followed this profile, with either a mild suppression, or sometimes, a significant increase in the SmA-SmC transition temperature, depending on the core type and the alkyl tail on the organogermanium compound. Typically, three-ring cores tended to increase the A/C transition temperature while two-ring cores tended to lower the A/C transition temperature. Methyl and ethyl constituents on the organogermanium compound gave good mesogenicity.

Figure 5:
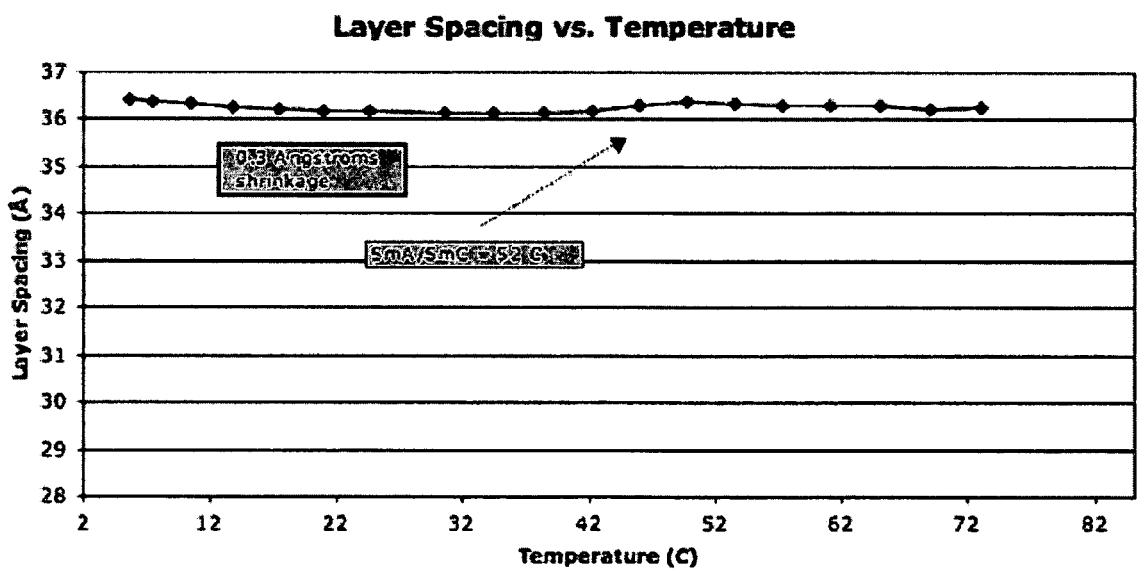
FIG. 5 is a layer-spacing versus temperature graph of a FLC composition comprising 20% of a mixture of organogermanium compounds of the present invention.
Figure 6:
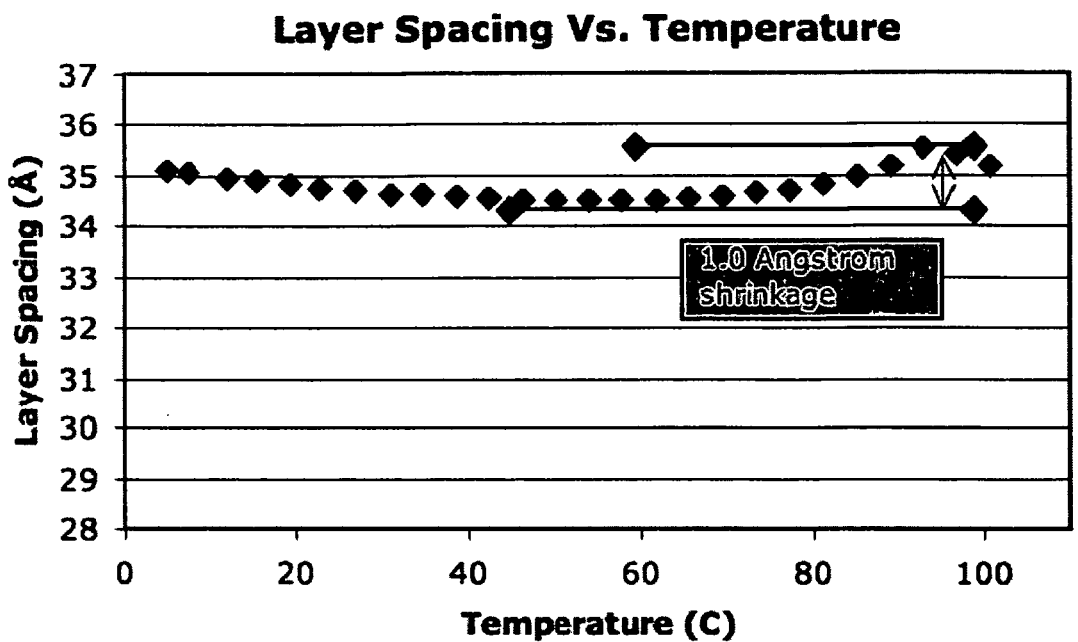
FIG. 6 is a layer-spacing versus temperature graph of a FLC composition comprising 20% of a mixture of organogermanium compounds of the present invention.

Examination of a lower concentration of organogermanium compounds in the liquid crystal compositions on the layer contraction effect in Smectic C mixtures showed that, as seen in MX10357 and FIG. 5, as little as 20% of organogermanium compound could provide a a mixture having a smectic C phase with almost temperature-invariant layer spacing. This demonstrated that control of the layer contraction is highly non-linear. The threshold amount of organogermanium compound necessary in a liquid crystal composition for inducing the desired bookshelf structure was found using lower concentrations.

Figure 4:
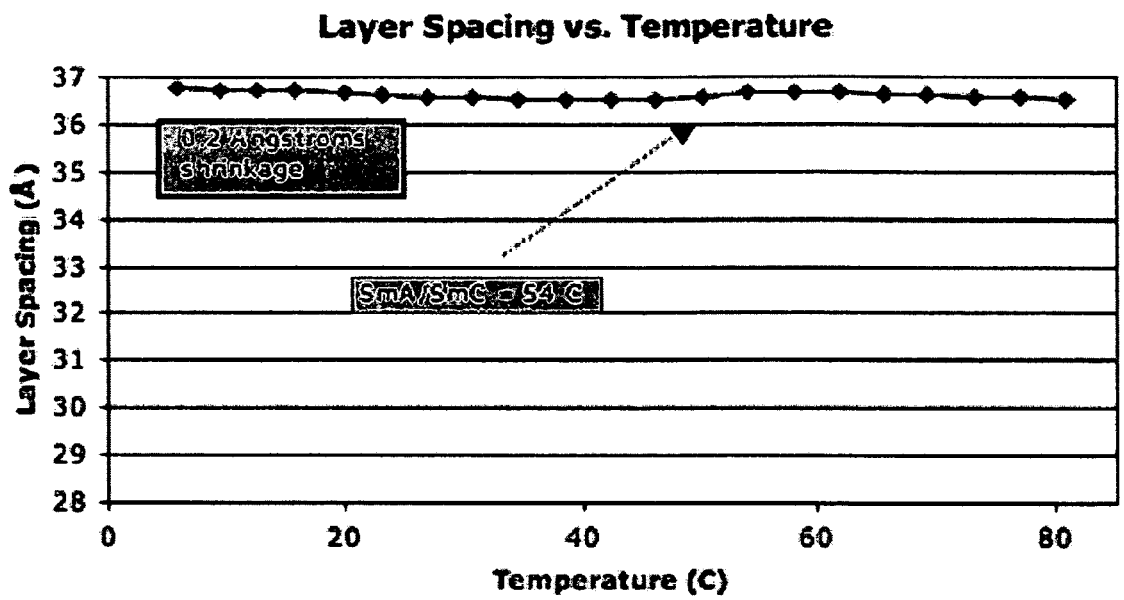
FIG. 4 is a layer-spacing versus temperature graph of a FLC composition comprising 50% an organogermanium compound of the present invention.

A layer contraction of about 1 angstrom was observed in MX10441, a liquid crystal composition comprising a three-ring biphenylpyrimidine system organogermanium compound, although the layer spacing then re-expanded at lower yet lower temperatures by about 0.5 angstroms, as seen in FIG. 4.

Liquid Crystal Composition Comprising Only or Organogermanium Compound(s)

Figure 7:
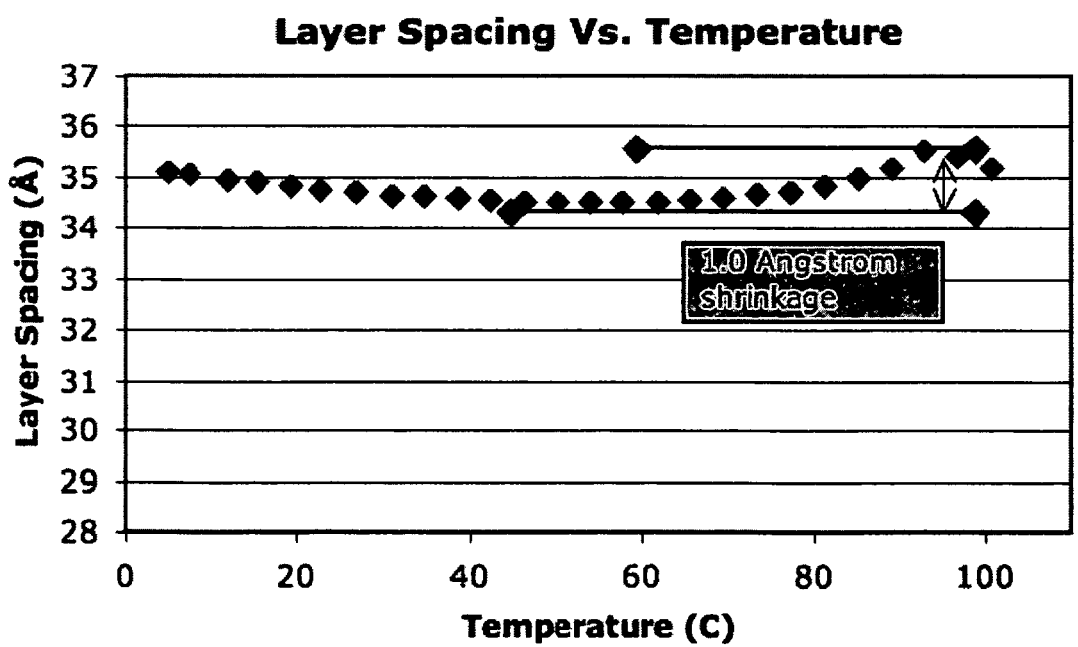
FIG. 7 is a layer-spacing versus temperature graph of a FLC composition comprising 50% of an organogermanium compound of the present invention having three aromatic rings.
Figure 8:
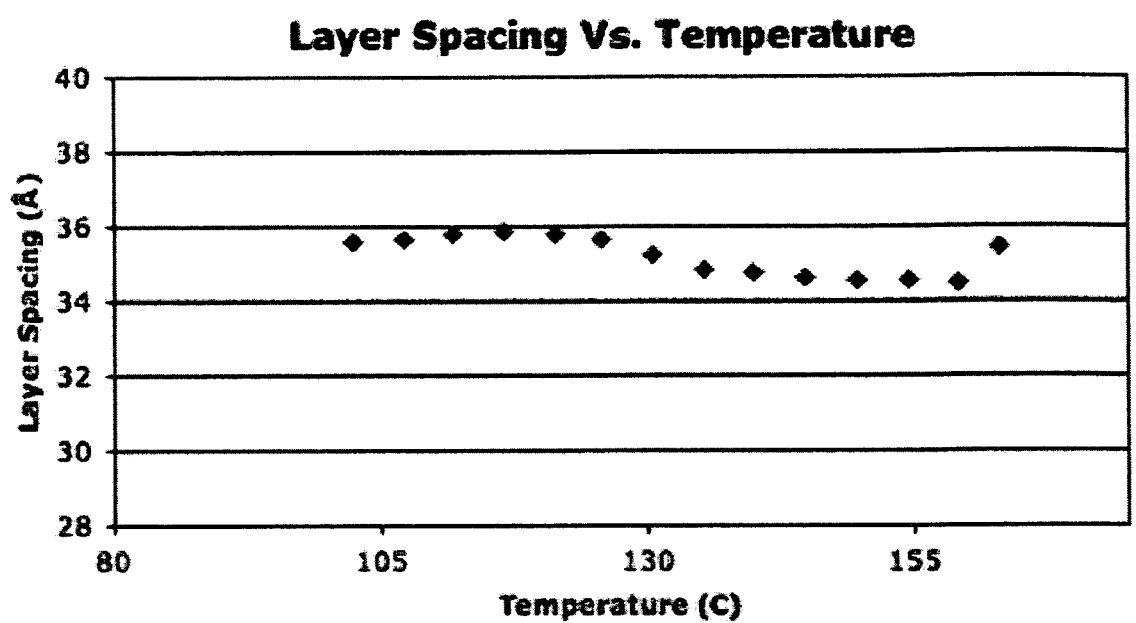
FIG. 8 is a layer-spacing versus temperature graph of a FLC composition comprising an organogermanium compound of the present invention.

One requirement for layer shrinkage analysis of an FLC is the presence of a SmA above the SmC phase. It is believed that if the SmC phase is formed directly from the isotropic phase, then the layers typically remain constant. Liquid crystal compositions comprising only organogermanium compounds often did not have a SmA phase. Accordingly, they were not measured for their x-ray behavior. However, liquid crystal composition comprising compound 2208 not only possesses a SmA phase but also a nematic phase. Its layer spacing vs. temperature is shown in FIG. 7.

Example 36

UV Stability Study

Measured portions of compounds in a solvent were meted into vials, and the solvent was then evaporated to give a thin film of compound on the walls and bottom of the vial. The portions were such that, after solvent evaporation, each vial held about 1 mg of the compound. Several compounds could be evaluated in each study, although each vial contained only a single compound. About 20 vials for each compound were prepared. Four vials for each compound were then reserved, and the remaining vials were then randomly distributed in a turntable, under an ultraviolet lamp that emitted about 8 mW/cm$^2$ light flux. A fluxmeter was also placed on the turntable. At regular intervals thereafter, one vial for each compound was removed and labeled, and the flux level was recorded. A typical study ran for at least 1700 hours, with samples being removed about every 200 hours. When the study was complete, the vials from the study were analyzed by HPLC/MS to determine the amount of remaining compound, using the reserved vials as a control. After about 1800 hours of UV exposure, the amount of degradation of compound 1259 was about 70%, the amount of degradation of compound 2051 was about 10% over 1800 hours, and the amount of degradation of organogermanium compound 2183 was about 5%

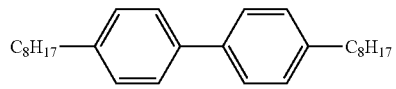

1259

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A liquid crystal composition comprising at least two different compounds, wherein at least one of the compounds is an organogermanium compound of the formula:

D-E-F;

wherein

D is a chain having from about 5 to about 20 chain atoms, wherein each of the chain atoms is independently selected from the group consisting of C, O, N, S, and Si;

E is a core moiety having two, three, or four ring moieties, wherein each ring moiety is connected to the other ring moiety by a linker, and wherein each linker is independently comprised of from 0 to about 5 chain atoms;

F is a moiety of the formula:

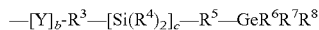

wherein each of b and c is independently 0 or 1;

Y is O, S, C(=W),-Z-C(=W)—; —C(=W)-Z-, —C≡C—, or NR$^2$;

W is O or S;

Z is O, S or NR$^9$;

each of R$^2$ and R$^9$ is independently hydrogen, alkyl, or a nitrogen protecting group;

each of R$^3$ and R$^5$ is independently selected from the group consisting of alkylene, haloalkylene, heteroalkylene, alkenylene, alkynylene, heteroalkenylene, and heteroalkynylene;

each R$^4$ is independently selected from the group consisting of hydrogen or C$_{1-4}$ alkyl; and each of R$^6$, R$^7$, and R$^8$ is independently C$_{1-4}$ alkyl.

2. The liquid crystal composition of claim 1, wherein said Organogermanium compound is a liquid crystal compound.

3. The liquid crystal composition of claim 1, wherein said liquid Crystal composition is a ferroelectric liquid crystal composition.

4. The liquid crystal composition of claim 1, wherein at least one of the other compounds in said liquid crystal composition is a non-organogermanium compound.

5. The liquid crystal composition of claim 1, wherein the total amount of organogermanium compound in said liquid crystal composition is at least 20%.

6. The liquid crystal composition of claim 1, wherein said liquid Crystal composition further comprises a second organogermanium compound.

7. The liquid crystal composition of claim 1, wherein the temperature range of smectic C phase exhibited by said liquid crystal composition is at least about 10° C. wide.

8. A liquid crystal composition which is in a liquid crystal phase at room temperature, said liquid crystal composition comprising an organogermanium compound.

9. The liquid crystal composition of claim 8, wherein said liquid crystal composition further comprises a non-organogermanium compound.

10. The liquid crystal composition of claim 8, wherein said liquid crystal composition is enantiotropic.

11. The liquid crystal composition of claim 8, wherein said liquid crystal composition further comprises a second organogermanium compound.

12. The liquid crystal composition of claim 11, wherein the total amount of organogermanium compounds in said liquid crystal composition is at least about 20%.

13. The liquid crystal composition of claim 8, wherein said organogermanium compound is a chiral compound.

14. An enantiotropic liquid crystal composition comprising an organogermanium compound.

15. The enantiotropic liquid crystal composition of claim 14, wherein said liquid crystal composition is in a liquid crystal phase at room temperature.

16. The enantiotropic liquid crystal composition of claim 14, wherein said liquid crystal composition further comprises at least one non-organogermanium compound, and wherein the amount of total non-organogermanium compounds in said liquid crystal composition is about 80% or less.

17. A liquid crystal organogermanium compound of the formula:

D-E-F;

wherein

D is a chain having from about 5 to about 20 chain atoms, wherein each of the chain atoms is independently selected from the group consisting of C, O, N, S, and Si;

E is a core moiety having two, three, or four ring moieties, wherein each ring moiety is connected to the other ring moiety by a linker, and wherein each linker is independently comprised of from 0 to about 5 chain atoms;

F is a moiety of the formula:

—[Y]$_b$—R$^3$—[Si(R$^4$)$_2$]$_c$—R$^5$—GeR$^6$R$^7$R$^8$ wherein each of b and c is independently 0 or 1;
Y is O, S, C(=W), -Z-C(=W)—; —C(=W)-Z-, —C≡C—, or NR$^2$;
W is O or S;
Z is O, S or NR$^9$;
each of R$^2$ and R$^9$ is independently hydrogen, alkyl, or a nitrogen protecting group;
each of R$^3$ and R$^5$ is independently selected from the group consisting of alkylene, haloalkylene, heteroalkylene, alkenylene, alkynylene, heteroalkenylene, and heteroalkynylene;
each R$^4$ is independently selected from the group consisting of hydrogen or C$_{1-4}$ alkyl; and
each of R$^6$, R$^7$, and R$^8$ is independently C$_{1-4}$ alkyl.

18. The liquid crystal organogermanium compound of claim 17, wherein each ring moiety of E is independently selected from the group consisting of cycloalkylene, heterocycloalkylene, cycloalkenylene, heterocycloalkenylene, arylene, and heteroarylene, each of which is independently optionally substituted.

19. The liquid crystal organogermanium compound of claim 18, wherein each arylene is independently selected from the group consisting of phenylene, naphthylene, dihydronaphthylene and tetrahydronaphthylene, each of which is independently optionally substituted.

20. The liquid crystal organogermanium compound of claim 18, wherein each heteroarylene contains one or two nitrogen ring atoms.

21. The liquid crystal organogermanium compound of claim 20, wherein each heteroarylene is independently selected from the group consisting of optionally substituted pyridinylene and optionally substituted pyrimindinylene.

22. The liquid crystal organogermanium compound of claim 18, wherein each ring moiety of E is independently arylene or heteroarylene, each of which is independently optionally substituted with one or two substituents, wherein each substituent is independently selected from the group consisting of halide, alkyl, haloalkyl, alkoxide, haloalkoxide, alkenyl, haloalkenyl, nitro, cyano, amino, monoalkylamino, and dialkylamino.

23. The liquid crystal organogermanium compound of claim 17, wherein each linker chain is independently comprised of from about 0 to about 4 carbon atoms within the linker chain and 0 to 1 heteroatom within the linker chain, wherein each of the heteroatom is independently selected from the group consisting of O, N and S.

24. The liquid crystal organogermanium compound of claim 17, wherein D is a moiety of the formula:

R$^1$—[X]$_a$— wherein
a is 0 or 1;
X is O, S, C(=W), -Z-C(=W); —C(=W)-Z-, —C≡C—, or NR$^2$;
W is O or S;
Z is O, S or NR$^9$;
R$^1$ is selected from the group consisting of alkyl, haloalkyl, heteroalkyl, alkenyl, alkynyl, heteroalkenyl, and heteroalkynyl; and
each of R$^2$ and R$^9$ is independently hydrogen, alkyl, or a nitrogen protecting group.

25. The liquid crystal organogermanium compound of claim 24, wherein R$^1$ is alkyl, haloalkyl, or heteroalkyl.

26. The liquid crystal organogermanium compound of claim 17, wherein each of R$^6$, R$^7$, and R$^8$ is independently methyl, ethyl, or butyl.

27. A liquid crystal composition comprising a compound of claim 17.

28. A compound of the Formula:

D-E-F;

wherein
D is a chain having from about 5 to about 20 chain atoms, and wherein D is a moiety of the formula:

R$^1$—[X]$_a$— wherein
a is 0 or 1;
X is O, S, C(=W),-Z-C(=W)—; —C(=W)-Z-,— C≡C—, or NR$^2$;
W is O or S;
Z is O, S or NR$^9$;
R$^1$ is selected from the group consisting of alkyl, haloalkyl, heteroalkyl, alkenyl, alkynyl, heteroalkenyl, and heteroalkynyl; and
each of R$^2$ and R$^9$ is independently hydrogen, alkyl, or a nitrogen protecting group;
E is a core moiety having two, three, or four ring moieties, wherein each ring moiety is connected to the other ring moiety by a linker, and wherein each linker is independently comprised of from 0 to about 5 chain atoms;

F is a moiety of the formula:

—[Y]$_b$—R$^3$—[Si(R$^4$)$_2$]$_c$—R$^5$—GeR$^6$R$^7$R$^8$ wherein each of b and c is independently 0 or 1;
Y is O, S, C(=W), -Z-C(=W)—;—C(=W)-Z-,— C≡C—, or NR$^2$;
W is O or S;
Z is O, S or NR$^9$;
each of R$^2$ and R$^9$ is independently hydrogen, alkyl, or a nitrogen protecting group;
each of R$^3$ and R$^5$ is independently selected from the group consisting of alkylene, haloalkylene, heteroalkylene, alkenylene, alkynylene, heteroalkenylene, and heteroalkynylene;
each R$^4$ is independently selected from the group consisting of hydrogen or C$_{1-4}$ alkyl; and
each of R$^6$, R$^7$, and R$^8$ is independently C$_{1-4}$ alkyl.

* * * * *